US012679568B2

(12) United States Patent
Moore et al.

(10) Patent No.: US 12,679,568 B2
(45) Date of Patent: Jul. 14, 2026

(54) FIXED-WING UNMANNED AERIAL VEHICLE CAPABLE OF HIGH ANGLE-OF-ATTACK MANEUVERING

(71) Applicant: The Johns Hopkins University, Baltimore, MD (US)

(72) Inventors: Joseph L. Moore, Finksburg, MD (US); Max R. Basescu, Columbia, MD (US); Adam C. Polevoy, Columbia, MD (US); Bryanna Y. Yeh, Hanover, MD (US); Luca Scheuer, Philadelphia, PA (US); Kevin C. Wolfe, Lutherville, MD (US)

(73) Assignee: The Johns Hopkins University, Baltimore, MD (US)

( * ) Notice: Subject to any disclaimer, the term of this patent is extended or adjusted under 35 U.S.C. 154(b) by 257 days.

(21) Appl. No.: 18/218,646

(22) Filed: Jul. 6, 2023

(65) Prior Publication Data

US 2024/0076066 A1     Mar. 7, 2024

Related U.S. Application Data

(60) Provisional application No. 63/403,974, filed on Sep. 6, 2022.

(51) Int. Cl.
| | |
|---|---|
| *B64U 10/25* | (2023.01) |
| *B64C 19/02* | (2006.01) |
| *B64U 50/13* | (2023.01) |
| *G05D 1/00* | (2006.01) |
| *B64U 101/30* | (2023.01) |

(52) U.S. Cl.
CPC .............. *B64U 10/25* (2023.01); *B64C 19/02* (2013.01); *B64U 50/13* (2023.01); *G05D 1/0808* (2013.01); *B64U 2101/30* (2023.01)

(58) Field of Classification Search
CPC ......... B64U 10/25; B64C 19/02; B64C 15/12; G05D 2109/24; G05D 1/495
See application file for complete search history.

(56) References Cited

U.S. PATENT DOCUMENTS

| | | | |
|---|---|---|---|
| 10,520,943 B2 * | 12/2019 | Martirosyan | G06T 7/292 |
| 2011/0089288 A1 * | 4/2011 | Deale | A63H 27/02 244/12.4 |
| 2021/0103297 A1 * | 4/2021 | Fillingham | G08G 5/32 |

OTHER PUBLICATIONS

Max Basescu et al., "Direct NMPC for Post-Stall Motion Planning with Fixed-Wing UAVs," IEEE, https://arxiv.org/abs/2001.11478, 2020, pp. 1-9.

(Continued)

*Primary Examiner* — Roy Rhee
(74) *Attorney, Agent, or Firm* — Noah J. Hayward

(57)     ABSTRACT

A fixed-wing unmanned aerial vehicle (UAV) includes a propeller gimbal operably coupled to the body of the UAV at the forward end and the propeller gimbal is configured to pivot the propeller about a gimbal pivot axis to change a propeller angle. A controller of the UAV may be configured to control an attitude of flight of the UAV by controlling operation of the motor, the propeller gimbal, and the control surface assembly. The controller may be further configured to determine in-flight trajectory modifications that may require high maneuverability via high angle-of-attack attitudes of flight that are implemented via the propeller gimbal and trajectories determined from a dynamics model of the fixed-wing UAV.

15 Claims, 10 Drawing Sheets

(56)  References Cited

OTHER PUBLICATIONS

M. Rehan et al., "Vertical take-off and landing hybrid unmanned aerial vehicles: An overview," The Aeronautical Journal, https://doi.org/10.1017/aer.2022.29, 2022, pp. 1-41.

\* cited by examiner

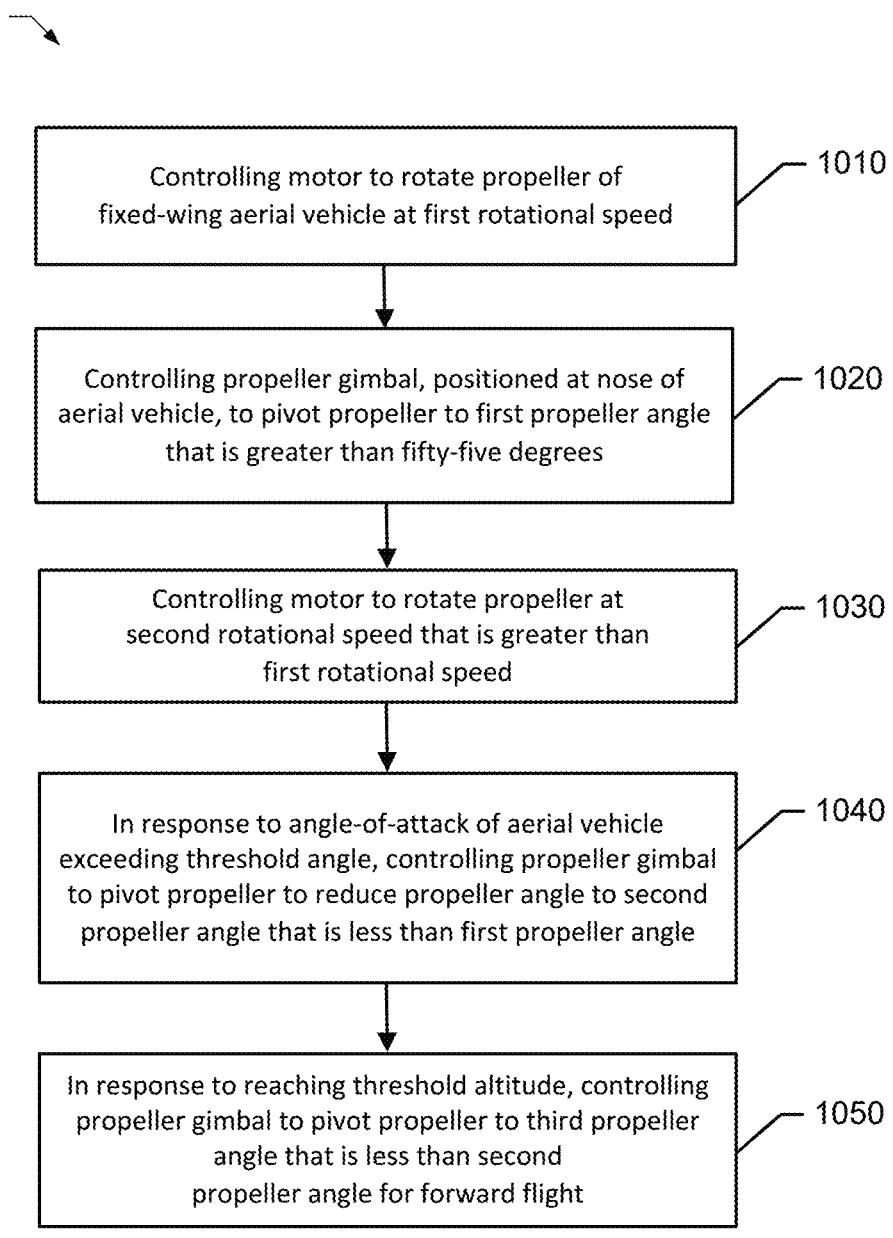

1000

Controlling motor to rotate propeller of fixed-wing aerial vehicle at first rotational speed — 1010

Controlling propeller gimbal, positioned at nose of aerial vehicle, to pivot propeller to first propeller angle that is greater than fifty-five degrees — 1020

Controlling motor to rotate propeller at second rotational speed that is greater than first rotational speed — 1030

In response to angle-of-attack of aerial vehicle exceeding threshold angle, controlling propeller gimbal to pivot propeller to reduce propeller angle to second propeller angle that is less than first propeller angle — 1040

In response to reaching threshold altitude, controlling propeller gimbal to pivot propeller to third propeller angle that is less than second propeller angle for forward flight — 1050

FIG. 10

FIXED-WING UNMANNED AERIAL VEHICLE CAPABLE OF HIGH ANGLE-OF-ATTACK MANEUVERING

CROSS-REFERENCE TO RELATED APPLICATIONS

This application claims priority to and the benefit of prior-filed, U.S. Provisional Application No. 63/403,974 filed on Sep. 6, 2022, the entire contents of which are hereby incorporated herein by reference.

STATEMENT OF GOVERNMENTAL INTEREST

This invention was made with Government support under contract number HR001120C0115 awarded by the Defense Advanced Research Projects Agency (DARPA). The Government has certain rights in the invention.

TECHNICAL FIELD

Exemplary embodiments generally relate to aviation technology, and more specifically relate to aerial vehicle maneuverability and navigation.

BACKGROUND

Fixed-wing unmanned aerial vehicles (UAVs) offer significant performance advantages over rotary-wing UAVs in terms of speed, endurance, and efficiency. Such attributes make these fixed-wing aerial vehicles ideally suited for long-range or high-speed reconnaissance operations and, therefore, such vehicle are well-positioned to be valuable complementary members of a heterogeneous multi-robot team. However, fixed-wing UAVs have traditionally been severely limited with regards to maneuverability in high density obstacle environments (e.g., forests, urban areas, etc.), and are limited by their inability to perform vertical takeoff and landing (VTOL) operations. Accordingly, it would be desirable to develop an aerial vehicle that enjoys the performance advantages of a fixed-wing vehicle, as well as the maneuverability and VTOL functionality of a rotary-wing vehicle.

BRIEF SUMMARY

According to some non-limiting, example embodiments, an unmanned aerial vehicle (UAV) is provided. The UAV includes a body having a forward end and a rearward end, a first fixed wing affixed to the body, a second fixed wing affixed to the body, a propeller configured to rotate about a propeller axis, and a motor operably coupled to the propeller and configured to rotate the propeller at a controlled rotational speed to generate thrust. The UAV may further include a propeller gimbal operably coupled to the body at the forward end. The propeller gimbal may be configured to pivot the propeller about a gimbal pivot axis to change a propeller angle. The propeller angle may be an angle of the propeller axis relative to a reference plane that is perpendicular to a plane that bisects the body between the first fixed wing and the second fixed wing. The UAV may further include a control surface assembly operably coupled to the body, and a controller configured to control an attitude of flight of the UAV by controlling operation of the motor, the propeller gimbal, and the control surface assembly. According to some example embodiments, the controller may be further configured to determine an initial flight trajectory to a goal point, and repeatedly update a flight trajectory, while the UAV is in flight, based on the initial flight trajectory or a prior flight trajectory, a dynamics model of the UAV, and a nonlinear model predictive control function.

According to some example embodiments, an aerial vehicle is provided. The aerial vehicle may include a body, a first fixed wing, and a second fixed wing. The body may have a forward end and a rearward end. The aerial vehicle may further include a propeller configured to rotate about a propeller axis, and a motor operably coupled to the propeller and configured to rotate the propeller at a controlled rotational speed to generate thrust. The propeller may be an only source of thrust for aerial propulsion for the aerial vehicle. The aerial vehicle may further include a propeller gimbal operably coupled to the body at the forward end. The propeller gimbal may be configured to pivot the propeller about a gimbal pivot axis to change a propeller angle. The propeller angle may be an angle of the propeller axis of rotation relative to a reference plane that is perpendicular to a plane that bisects the body between the first fixed wing and the second fixed wing. The aerial vehicle may also include a control surface assembly operably coupled to the body, and a controller configured to control the control surface assembly, based on a flight trajectory determined by the controller, to cause the aerial vehicle to enter a stall attitude. The controller may be further configured to, while in the stall attitude, control the propeller gimbal to pivot the propeller into a position where the aerial vehicle remains airborne despite maintaining the stall attitude. According to some example embodiments, the controller may be further configured to determine an initial flight trajectory to a goal point, and repeatedly update the flight trajectory, while the aerial vehicle is in flight, based on the initial flight trajectory or a prior flight trajectory, a dynamics model of the aerial vehicle, and a nonlinear model predictive control function.

According to some example embodiments, a method for performing a vertical takeoff by a fixed-wing unmanned aerial vehicle (UAV) is provided. The example method may include controlling, by a controller of the fixed-wing UAV, a motor to rotate a propeller at a first rotational speed while the fixed-wing UAV is grounded. The propeller may be operably coupled to a propeller gimbal and positioned at a forward end of a body of the fixed-wing UAV. The example method may further include controlling the propeller gimbal to pivot the propeller to a first propeller angle that is greater than fifty-five degrees, and controlling the motor to rotate the propeller at a second rotational speed that is greater than the first rotational speed. The example method may also include, in response to an angle-of-attack of the fixed-wing UAV exceeding a threshold angle, controlling the propeller gimbal to pivot the propeller to reduce the propeller angle to a second propeller angle that is less than the first propeller angle, and, in response to reaching a threshold altitude, controlling the propeller gimbal to pivot the propeller to a third propeller angle that is less than the second propeller angle for forward flight. According to some example embodiments, the example method may also include determining an initial flight trajectory to a goal point, and repeatedly updating a flight trajectory of the fixed-wing UAV, while in flight, based on the initial flight trajectory or a prior flight trajectory, a dynamics model of the UAV, and a nonlinear model predictive control function.

BRIEF DESCRIPTION OF THE DRAWINGS

Figure 1:
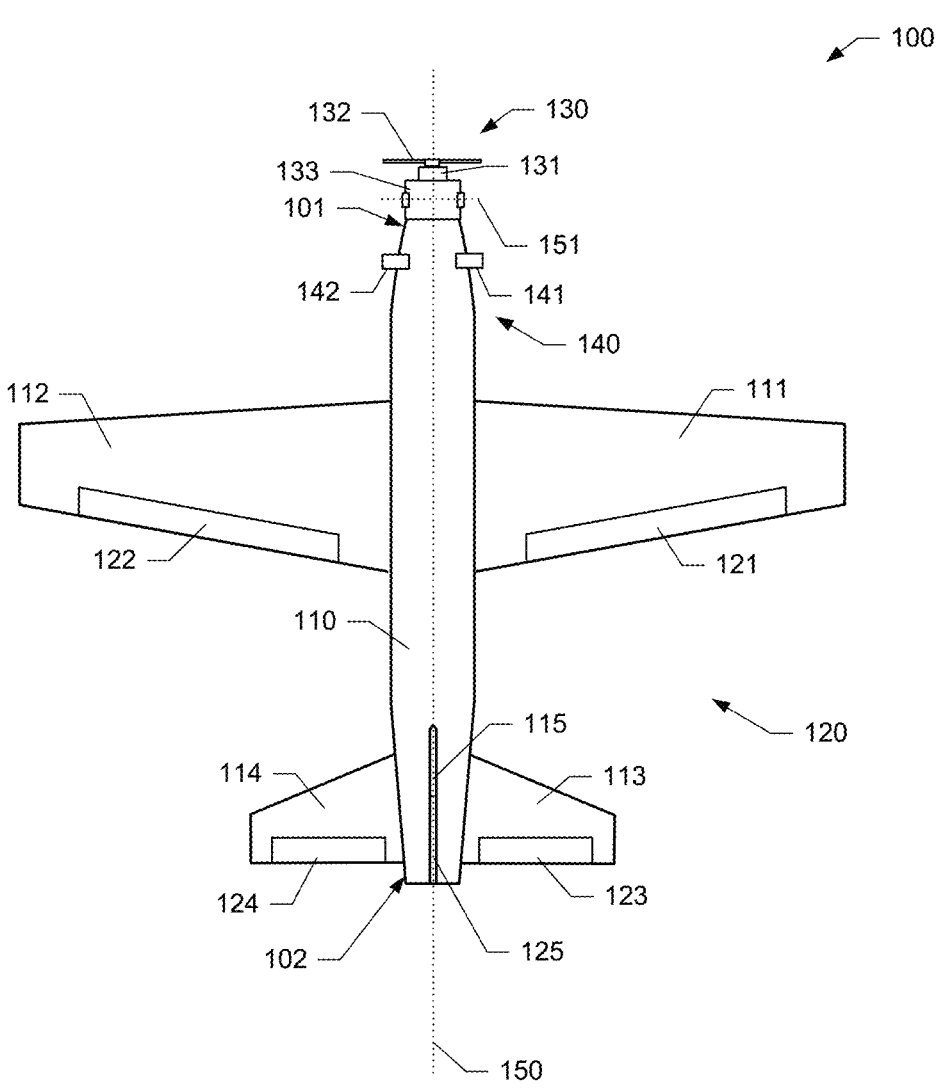
Figure 2:
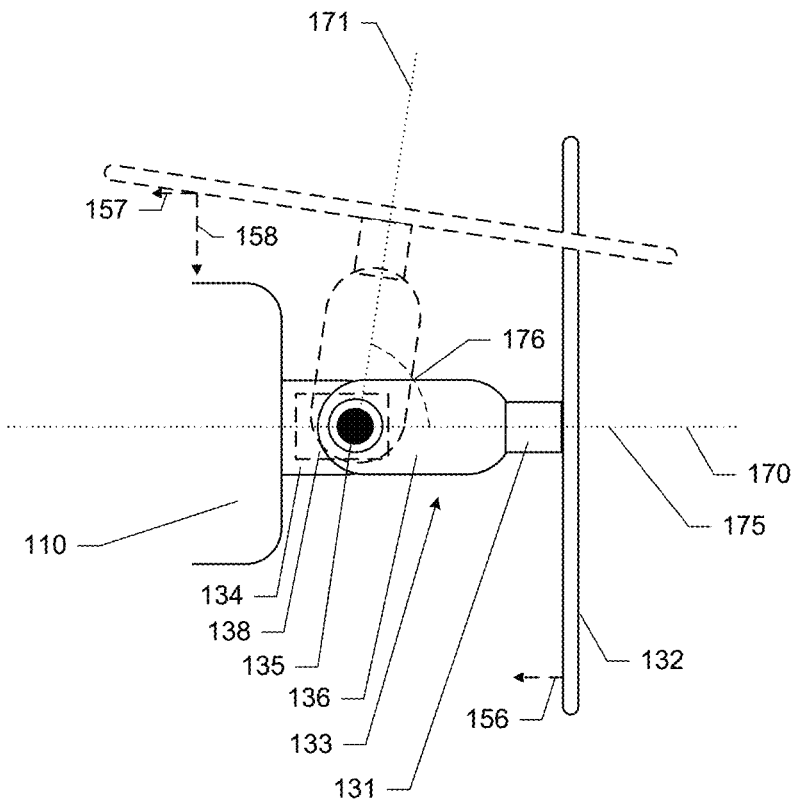
Figure 3:
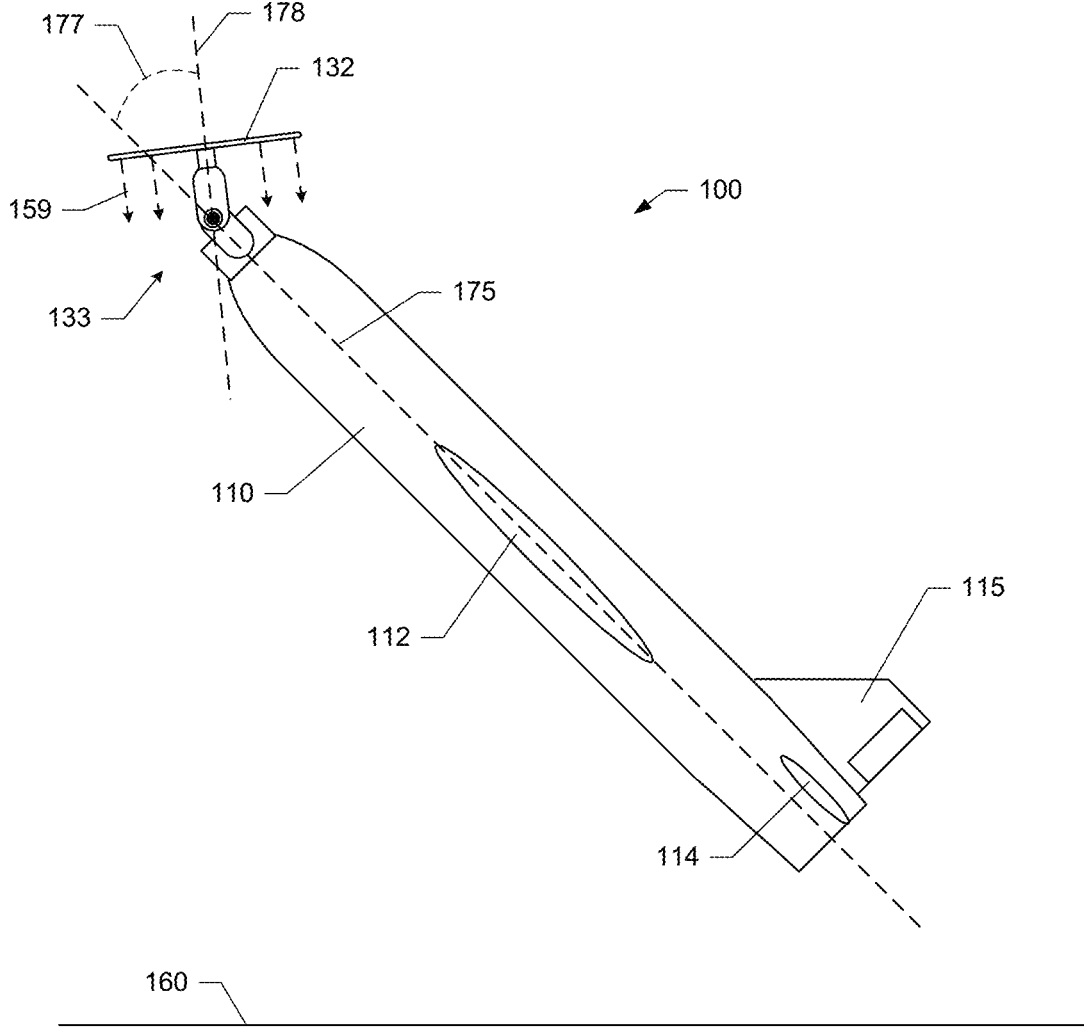
Figure 4:
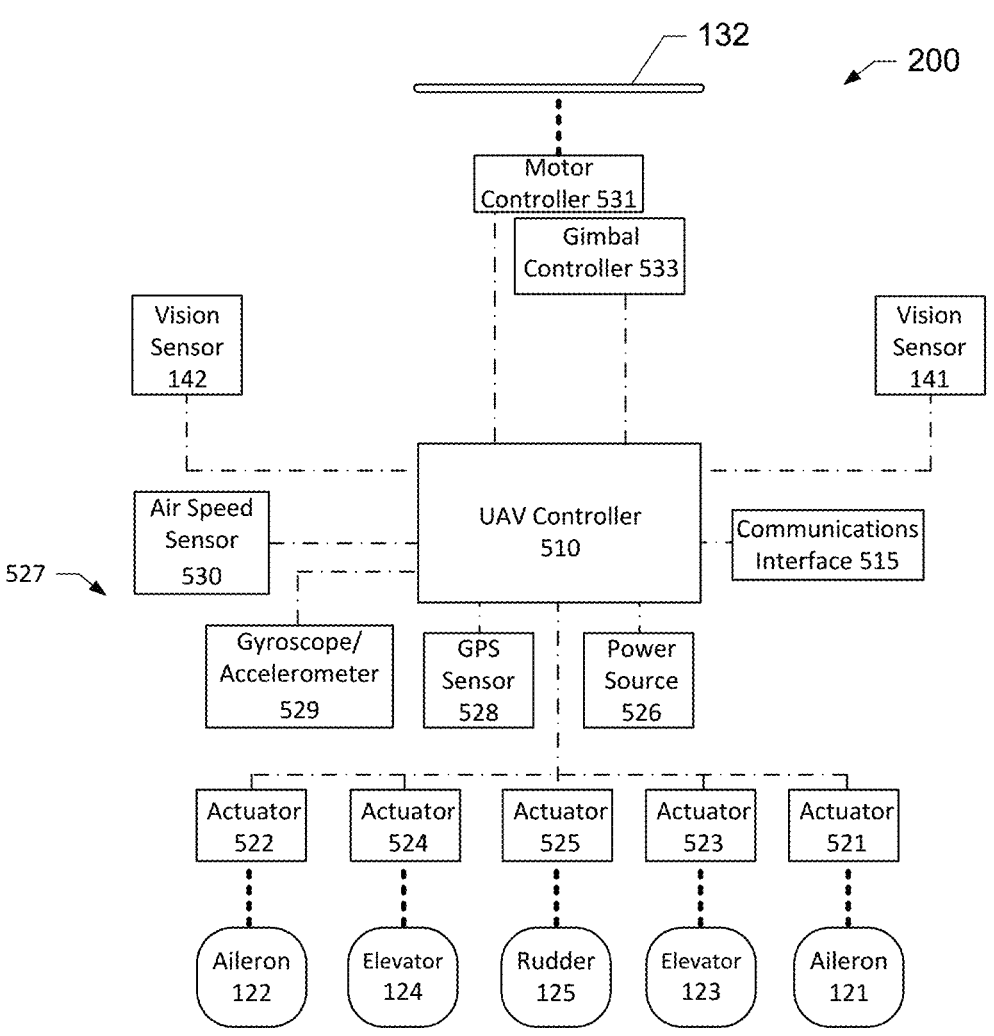
Figure 5:
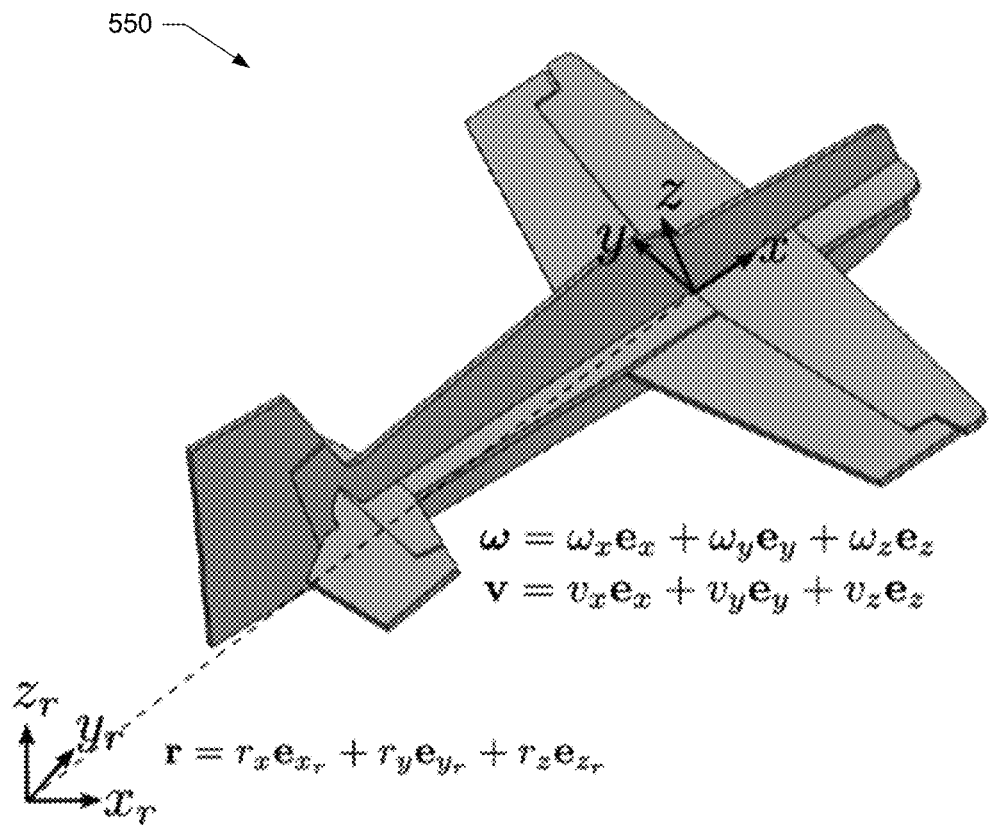
Figure 6:
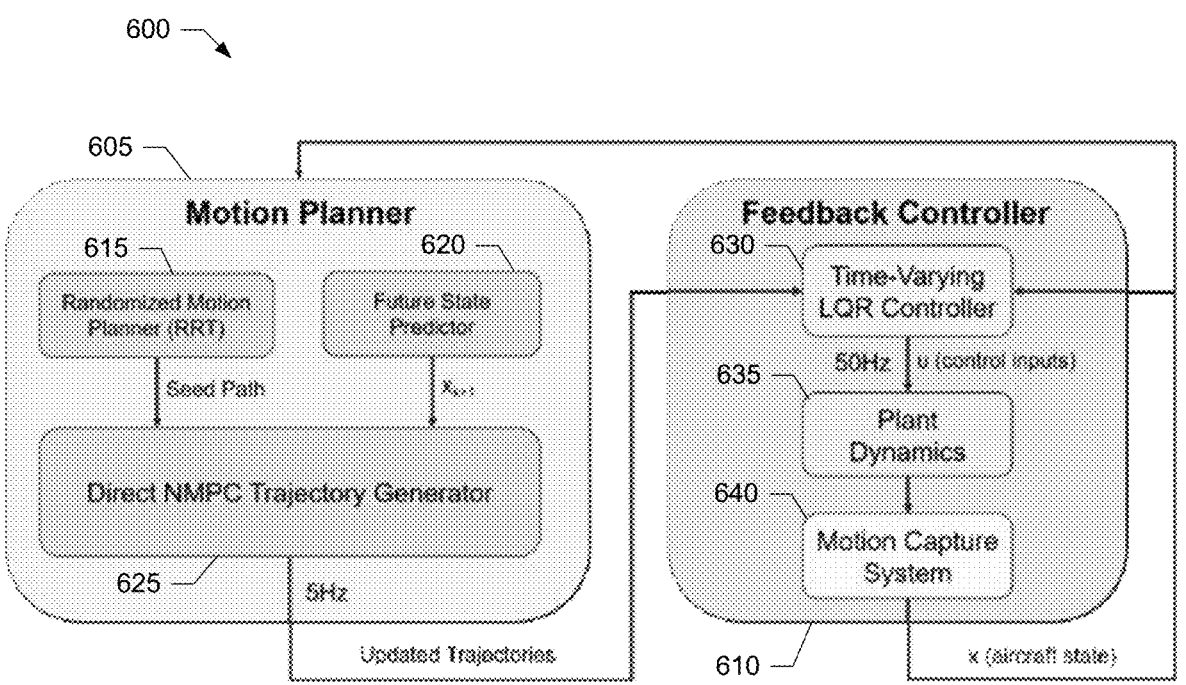
Figure 7:
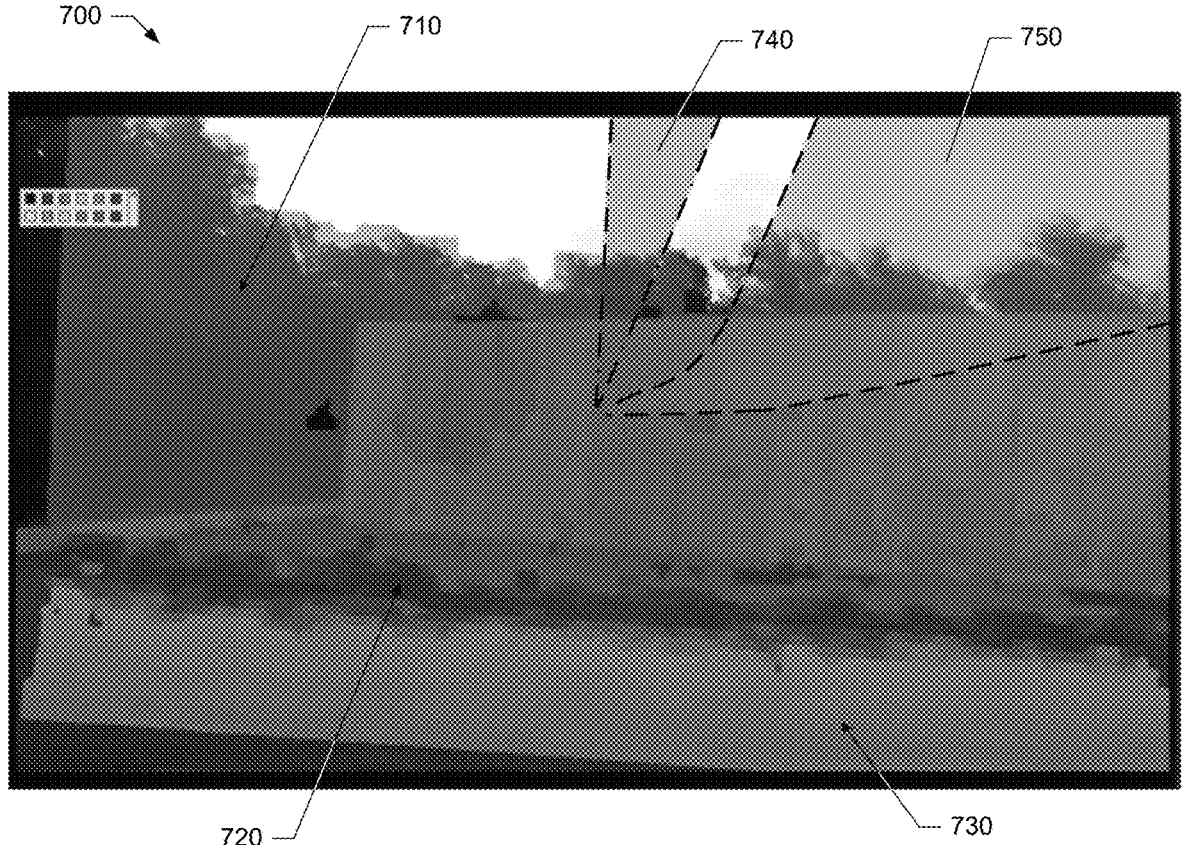
Figure 8:
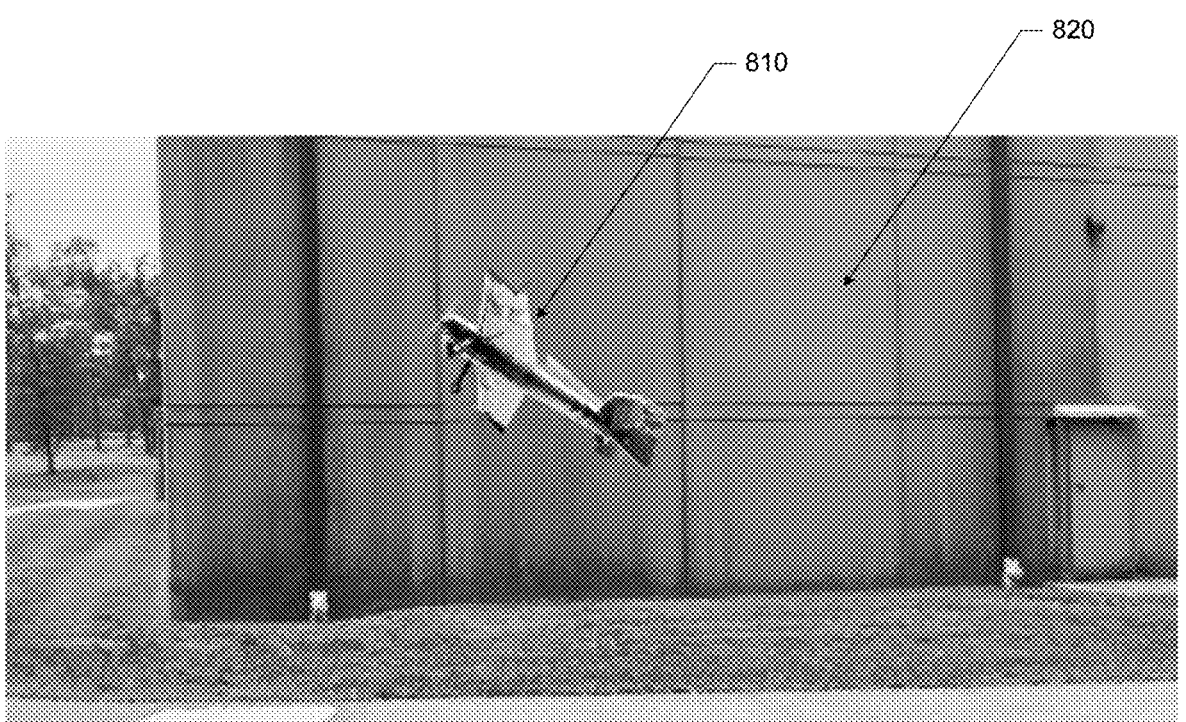
Figure 9:
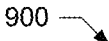
Figure 9:
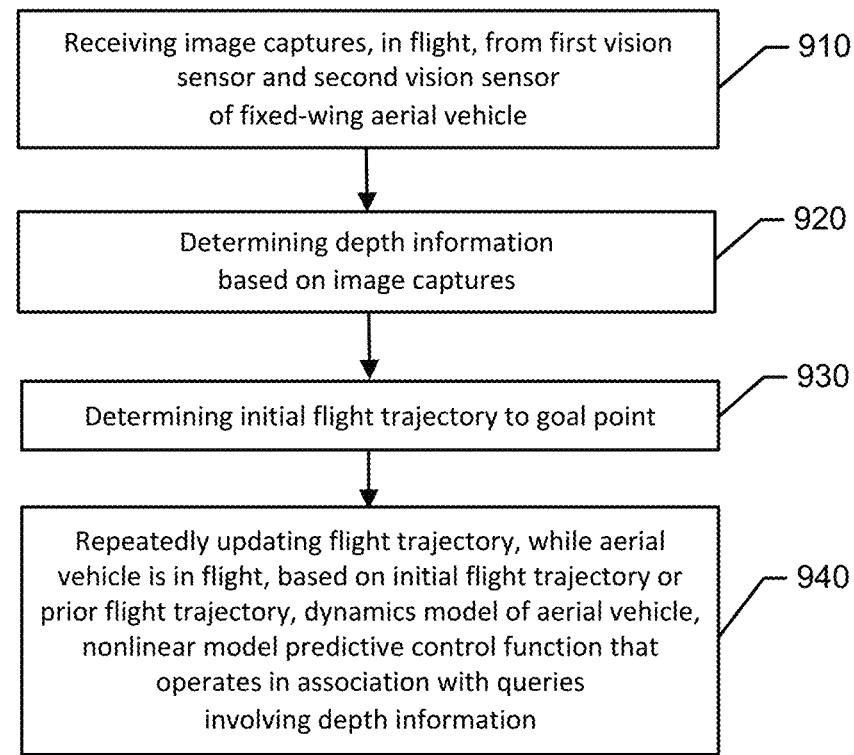

Having thus described some non-limiting, example embodiments in general terms, reference will now be made to the accompanying drawings, which are not necessarily drawn to scale, and wherein:

FIG. 1 illustrates a top view of a fixed-wing UAV according to some example embodiments;

FIG. 2 illustrates a zoomed, side view of the forward end of a fixed-wing UAV showing pivoting movement of a propeller due to actuation of a propeller gimbal according to some example embodiments;

FIG. 3 illustrates a side view of a fixed-wing UAV in a stall or high angle-of-attack attitude according to some example embodiments;

FIG. 4 illustrates a block diagram of an electrical control system for a fixed-wing UAV according to some example embodiments;

FIG. 5 illustrates a perspective view of a fixed-wing aerial vehicle shown in association with coordinate frames for a dynamics model according to some example embodiments;

FIG. 6 illustrates a block diagram of a receding-horizon control approach according to some example embodiments;

FIG. 7 illustrates a visualization of depth information and flight trajectories according to some example embodiments;

FIG. 8 illustrates a fixed-wing UAV entering a stall attitude in preparation to perform a high angle-of-attack turn around a corner of a building according to some example embodiments;

FIG. 9 illustrates a flowchart of a method for determining a flight trajectory of a fixed-wing aerial vehicle according to some example embodiments; and FIG. 10 illustrates a flowchart of a method for implementing a vertical takeoff of a fixed-wing aerial vehicle according to some example embodiments.

DETAILED DESCRIPTION

Some non-limiting, example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As provided herein, the term "or" is intended to have the meaning of the logical "or" operator (in contrast to the exclusive "or" operator) such that A or B means that A is an option, B is an option, and A and B together are an option.

According to some example embodiments, a fixed-wing UAV is described that includes features to support high maneuverability for obstacle avoidance and VTOL functionality. According to some example embodiments, techniques coupled with hardware advancements are described that enable agile fixed-wing UAVs to operate, for example, in high obstacle density environments, such as urban and forest environments, and also, according to some example embodiments, within a plurality of UAVs (or a swarm). To do so, a direct nonlinear model predictive control (NMPC) function or algorithm, according to some example embodiments, may be implemented to execute real-time or in-flight modified trajectories used to control flight of the fixed-wing UAV in association with aggressive post-stall, high angle-of-attack maneuvers to increase overall maneuverability. A high angle-of-attack may be an angle-of-attack that is associated with a stall condition of flight which can occur, for example, at angles-of-attack that are greater than about sixteen or seventeen degrees, where air flow over the wings does not maintain lift. A real-time or in-flight planning and control technique may enable navigation of the fixed-wing UAV through tight corridors and in close proximity to obstacles using such techniques. Such maneuverability and VTOL functionalities may be realized through use of a gimballed propeller design that allows, for example, a single forward mounted propeller on the fixed-wing UAV as the sole source of propulsion to be movable relative to the body of the vehicle into different angular positions for flight control. Additionally, as an input to enable such navigation and maneuverability, a fixed-wing UAV may include onboard stereo vision sensors capable of three-dimensional optical mapping of the UAV's environment to enable flight trajectory adjustments based on associated depth information during high speed flight in unknown environments. Via implementation of such sensors and a gimballed propeller, functionalities such as swarm integration, automatic takeoff, precision deep-stall landing, and multi-vehicle collision avoidance can be implemented.

Autonomous robot swarms can transform many domains where robotic systems already play an important role, including search and rescue, disaster response, transportation, and defense. While multi-robot and swarm control have been considered, the impact of high-speed, highly dynamic robotic systems on swarm operations in complex real world environments has not been realized, particularly for fixed-wing UAVs. Because fixed-wing UAVs are viewed as being less maneuverable than rotary-wing UAVs, in general, fixed-wing UAVs have not been considered for such applications. In conventional low angle-of-attack flight regimes, fixed-wing UAVs have a high minimum airspeed and a relatively large minimum turning radius when compared with rotary-wing UAVs. Such attributes dramatically limit a fixed-wing UAV's ability to navigate in complex obstacle fields. Moreover, fixed-wing UAVs often require large areas for launch and recovery due to their limited takeoff and landing capabilities, thus greatly complicating swarm deployment logistics.

However, fixed-wing UAVs can provide a speed and endurance advantage over their rotary-wing counterparts. As such, many applications exist where a highly agile fixed-wing UAV, capable of navigating through complex environments, would be a significant asset, in particular, within an autonomous swarm. For instance, an agile fixed-wing UAV could dramatically increase the overall tactical range of a swarm system as a result of the ability to travel longer distances while also being able to complete many tasks traditionally reserved for rotary-wing UAVs (e.g., a low-altitude reconnoiter of a narrow alleyway). Such fixed-wing UAVs can also serve as high-speed assets that can out-maneuver adversaries and conduct rapid reconnaissance. Additionally, such an agile fixed-wing UAV may have a substantial energy use advantage over a rotary-wing UAV thereby supporting, for example, increased range.

To unlock the potential of fixed-wing UAVs, planning and control strategies can be implemented on the UAV that exploit the vehicle's full flight envelope, including high angle-of-attack flight. Dynamic flight models and techniques can be implemented that plan flight trajectories in real-time or in-flight to take advantage of the full flight envelope. To do so, according to some example embodiments, an agile fixed-wing UAV may leverage onboard software and hardware to implement an autonomy stack that seeks to address the challenges associated with operating agile fixed-wing UAVs, for example, as part of an autonomous swarm in complex urban environments. Again, a nonlinear model predictive (NMPC) function may be implemented that exploits post-stall, high angle-of-attack aerodynamics to enable fixed-wing navigation. Such an NMPC function may use direct trajectory optimization (i.e., direct NMPC) to compute dynamically feasible, collision-free flight trajectories in real-time or in-flight based on vehicle state and location information. Further, according to some example embodiments, a dynamics model (e.g., in some instances a simplified or minimized dynamics model) may be implemented to solve a very fast optimization problem for flight trajectory updates while enforcing both state and actuator constraints on the vehicle, as well as defined collision constraints. Additionally, the NMPC function may leverage real-time or in-flight, three-dimensional environmental mapping via onboard stereo visual or optical sensing to enable navigation without an a priori map. The fixed-wing UAV may, according to some example embodiments, be capable of visual feature detection at high speeds and aggressive angle-of-attack attitudes, while additionally or alternatively being configured to implement a near-vertical takeoff capability leveraging a gimballed propeller design to implement such a takeoff and a post-stall, high angle-of-attack landing. Additionally, leveraging onboard stereo visual sensing, some example embodiments may implement collision avoidance techniques in the context of a fixed-wing UAV leveraging the NMPC function. Navigation of the UAV, according to some example embodiments, may be based on such a control algorithm that uses a dynamics model of the vehicle as described herein.

Despite their ubiquity in many commercial domains, fixed-wing UAVs have received significantly less attention than rotary-wing (e.g. quadcopter) UAVs in the world of mobile robotics applications. While some considerations of post-stall, high angle-of-attack flight of fixed-wing UAVs has been considered in some limited contexts, there still remains a need for a fixed-wing UAV that can perform operations including high maneuverability optical avoidance using, for example, high angle-of-attack flight maneuvers and vertical takeoff and landing capabilities.

Accordingly, various example embodiments described herein may operate to successfully navigate in complex, dynamic environments which are unknown a priori. Further, according to some example embodiments, a fixed-wing UAV may also be able to generate and track sophisticated flight trajectories in-flight and in real-time that exploit the full flight envelope of fixed-wing flight and thereby achieve high maneuverability. For example, in high angle-of-attack flight (i.e., when the airflow is separated from the fixed wing), the excess drag on the fixed-wing UAV may be exploited to rapidly slow down and execute tight turning, while using the vehicle's thrust to counteract the loss in lift and contribute to the centripetal acceleration. Such high angle-of-attack maneuvers can have the potential to dramatically reduce vehicle turning radii, allowing a fixed-wing UAV to operate in constrained spaces (e.g., urban centers), as well as in dense swarming scenarios. At such high angles-of-attack, a fixed-wing UAV can perform low turn radii maneuvers on par with the rotary-wing UAVs. Further, such an example embodiment of a fixed-wing UAV can achieve smaller turn radii than a similarly sized fixed-wing UAV that is restricted to a low angle-of-attack flight regime. Such turning radius advantage need not be restricted to high thrust-to-weight ratios for a fixed-wing aerial vehicle, because such an approach can also improve maneuverability for modest thrust-to-weight ratio fixed-wing aerial vehicles. According to some example embodiments, a puller configuration may be implemented where the propeller is disposed at the forward end of the vehicle, such that the thrust of the propeller pulls the aerial vehicle in flight. Such a puller configuration can take advantage of the control authority affored by propeller backwash at low air-speeds on control surfaces. In addition to improving turning radius, post-stall, high angle-of-attack maneuvers may be useful for achieving short landings (e.g., via post-stall, high angle-of-attack perching and near-vertical takeoffs). Post-stall, high angle-of-attack regimes can also be useful for slower cruise speeds, such as might be needed when flying with a limited sensor horizon.

According to some example embodiments, the UAV may include a UAV controller configured to control an attitude of flight of the UAV by controlling operation of a motor, a propeller gimbal, and a control surface assembly. Further, according to some example embodiments, to maximize maneuverability (e.g., minimize turning radius), a UAV controller may leverage a complex nonlinear aerodynamics model, without a useful differentially flat system. While trajectory libraries can be used to reduce online computational burdens for systems with non-trivial dynamics, such libraries can be expensive to search in real-time and can result in sub-optimal solutions when the vehicle state space is large (e.g., greater than six) and the environment is complex.

Therefore, as an alternative to building a high-fidelity physics model of the UAV, according to some example embodiments, a dynamic model of the UAV in the form of a minimalistic medium-fidelity physics model sufficient to capture the nonlinear post-stall, high angle-of-attack aerodynamics may be built that is amenable to real-time or in-flight trajectory optimization. According to some example embodiments, a direct trajectory optimization method may be used, despite the computational complexity, due to improved numerical conditioning, sparse constraints, and an ability of gradient computations to be trivially parallelized. Additionally, costs and constraints can be directly applied on the state trajectory using direct trajectory optimization. Such direct trajectory methods may also be seeded by a simplified randomized motion planner. In this regard, a controller of the fixed-wing UAV may formulate a nonlinear optimization problem that can be solved at real-time rates and use local linear feedback as an ancillary controller to stabilize the vehicle between re-plans. Additionally, the controller may be configured to optimize and control over the entire vehicle state-space, without the need for assumptions about timescale separations. Such an online trajectory optimization approach may be referred to as direct nonlinear model predictive control, or direct NMPC, which can be contrasted with other NMPC formulations because the flight trajectory is optimized over several sampling intervals.

Referring to FIG. 1, an example fixed-wing UAV 100 according to some example embodiments is shown. In this regard, the fixed-wing UAV 100 may be an aerial vehicle that is configured to fly under control of a remote control device or via autonomous control by an on-board controller. The fixed-wing UAV 100 may include various components and assemblies to support flight. In this regard, the fixed-wing UAV 100 may include structural components including a body 110, a right fixed wing 111, a left fixed wing 112, a right horizontal stabilizer 113, a left horizontal stabilizer 114, and a vertical stabilizer 115. Additionally, the fixed-wing UAV 100 may include a control surface assembly 120, a propeller assembly 130, and a sensor assembly 140.

With respect the structural components, the body 110 (or fuselage) may be formed of a rigid material and may be an elongated central component from which other structural components extend. The body 110 may have a forward end 101 (i.e., a nose end) and a rearward end 102 (i.e., tail end). The body 110, according to some example embodiments, may provide structural support to, for example, control circuitry, a power source (e.g., a battery), sensors, or the like. In some instances, the body 110 may have an internal cavity to stow such components or cargo. The right fixed wing 111 may extend from the right side of the body 110 and may be shaped to create lift during flight (e.g., may have an airfoil shape). Similarly, the left fixed wing 112 may extend from the left side of the body 110 and may also be shaped to create lift during flight (e.g., may have an airfoil shape). As fixed wings, the right fixed wing 111 and the left fixed wing 112 may be affixed to the body 110 such that the wings are not controllably moveable relative to body 110 during flight. Additionally, the right fixed wing 111 and the left fixed wing 112 may, according to some example embodiments, derive lift from the motion of air over aerodynamically structured surfaces that are rigidly and permanently affixed to the body 110 of the UAV 100. According to some example embodiments, the wings 111 and 112 need not, and in some example embodiments do not, have propulsion devices (e.g., propellers or the like) affixed thereto. According to some example embodiments, the wings 111 and 112 may be positioned on the body 110 to be aligned with a center of gravity of the fixed-wing UAV 100.

The right horizontal stabilizer 113 and the left horizontal stabilizer 114 may be disposed near the rearward end 102 of the UAV 100. In this regard, the stabilizers 113 and 114 may be shaped to create lift at the rear of the UAV 100 to stabilize the UAV 100 during flight. The right horizontal stabilizer 113 may extend from the body 110 and may be affixed to the body 110 such that the right horizontal stabilizer 113 is not controllably moveable relative to the body 110. Similarly, the left horizontal stabilizer 114 may extend from the body 110 and may be affixed to the body 110 such that the left horizontal stabilizer 113 is not controllably moveable relative to the body 110. Additionally, the vertical stabilizer 115 may extend from the body in a direction perpendicular to the stabilizers 113 and 114. According to some example embodiments, such as those shown in FIGS. 2 and 4, the vertical stabilizer 115 may extend from a top surface of the body 110. The vertical stabilizer 115 may also be affixed to the body 110 such that the vertical stabilizer 115 is not controllably moveable relative to the body 110.

According to some example embodiments, the body 110 and the wings 111 and 112 may have bilateral symmetry at a plane 150 (i.e., geometric plane) that is disposed between the wings 111 and 112 and does not intersect with the extension of the wings 111 and 112. According to some example embodiments, the vertical stabilizer 115 may be disposed within the plane 150. Based on the plane 150, a reference plane may also be defined that is perpendicular to the plane 150. The reference plane may intersect with the body 110 but is not required to do so. As further described herein, the axis of rotation of the propeller 132 may be parallel to (i.e., have a zero degree angle to) the reference plane, when the propeller 132 is positioned to generate thrust only for forward movement of the UAV 100.

As mentioned above, the fixed-wing UAV 100 may also include a control surface assembly 120. The control surface assembly 120 may be a collection of control surfaces that are moveable via respective actuators to affect the flight of the UAV 100. The control surface assembly 120 may be operably coupled to the body 110, according to some example embodiments, via the wings 111 and 112, the horizontal stabilizers 113 and 114, and the vertical stabilizer 115. Such control surfaces may include, for example, a right aileron 121, a left aileron 122, a right elevator 123, a left elevator 124, and a rudder 125. The right aileron 121 may be disposed on a rearward side of the right fixed wing 111 and may be configured to controllably pivot relative to the surfaces of the right fixed wing 111 to affect air flow over or under the right fixed wing 111. The left aileron 122 may be disposed on a rearward side of the left fixed wing 112 and may be configured to controllably pivot relative to the surfaces of the left fixed wing 112 to affect air flow over or under the left fixed wing 112. Similarly, the right elevator 123 may be disposed on a rearward side of the right horizontal stabilizer 113 and may be configured to controllably pivot relative to the surfaces of the right horizontal stabilizer 113 to affect air flow over or under the right horizontal stabilizer 113. The left elevator 124 may be disposed on a rearward side of the left horizontal stabilizer 114 and may be configured to controllably pivot relative to the surfaces of the left horizontal stabilizer 114 to affect air flow over or under the left horizontal stabilizer 114. The rudder 125 may be disposed on a rearward side of the vertical stabilizer 115 and may be configured to controllably pivot relative to the surfaces of the vertical stabilizer 115. As mentioned above, each of these control surfaces may be operably coupled to an actuator (e.g., a servo or the like) that is electrically controlled to move and cause associated movement of the corresponding control surface. Via movement of the control surfaces, various maneuvers may be performed, in some instances, in collaboration with controlling the thrust provided by the propeller assembly 130.

The propeller assembly 130 may include, according to some example embodiments, a motor 131, a propeller 132, and a propeller gimbal 133. The motor 131 may be, according to some example embodiments, an electric motor having a drive shaft that is rotatable by the motor at a controllable rotational speed. The motor 131 may be operably coupled to the propeller 132 to rotate the propeller 132. According to some example embodiments, the propeller 132 may include a plurality of blades that extend from a hub that is operably coupled to the drive shaft of the motor 131. The blades may be structured to create thrust to propel the UAV 100 when the blades are rotated by the motor 131. According to some example embodiments, the propeller 132 driven by the motor 131 and positioned at the forward end 101 (e.g., at the nose of the body 110), and the propeller 132 may be the only form of propulsion for the UAV 100.

The propeller gimbal 133 may be operably coupled to the propeller 132, for example, via the motor 131, and the propeller gimbal 133 may operate to change an orientation of the propeller 132 relative the body 110 and the wings 111 and 112, as well as the reference plane. According to some example embodiments, the propeller gimbal 133 may be positioned at the forward end 101 of the body 110. In this regard, the propeller gimbal 133 may be configured to pivot the propeller 132 to move an axis of rotation of the propeller 132 (i.e., the propeller axis) to change a direction of the thrust caused by rotation of the propeller 132. The propeller gimbal 133 may pivot about an axis 151, which may be orthogonal to the plane 150 and parallel to the reference plane. Via pivoting of the propeller 132 via the propeller gimbal 133, the fixed-wing UAV 100 may be able to cause the UAV 100 to have improved maneuverability in a stall or high angle-of-attack position, and may operate to maintain flight and control movement of the UAV 100 in such a position. Accordingly, in such a stall or high angle-of-attack attitude, the UAV 100 may be configured to perform small radius turns at low air speeds that would not be possible without the ability to change the propeller angle via the propeller gimbal 133. Additionally, via pivoting of the propeller 132, the fixed-wing UAV 100 may be able to exploit high angle-of-attack positioning to perform vertical or near-vertical takeoffs and landings.

Referring to FIG. 2, a zoomed illustration of the propeller gimbal 133 is shown. In this regard, a gimbal base 134 of the propeller gimbal 133 may be affixed to the body 110. Additionally, a gimbal arm 136 may be operably coupled to the gimbal base 134 via a hinge 135. The motor 131 may be operably coupled to the gimbal arm 136 such that the drive shaft of the motor 131 moves with the gimbal arm 136. The propeller 132 may be operably coupled to the drive shaft of the motor 131.

As such, the gimbal arm 136 may be configured to pivot relative to the gimbal base 134 and the body 110, as well as, the reference plane. The propeller gimbal 133 may also include a gimbal actuator 138 that may operate to pivot the gimbal arm 136 about an axis of the hinge 135, referred to as the gimbal pivot axis 151. According to some example embodiments, the gimbal pivot axis 151 may be parallel to the reference plane as described above. The gimbal actuator 138 may be affixed to the gimbal base 134, and may be operably coupled to the gimbal arm 136 to cause the gimbal arm 136 to pivot. According to some example embodiments, the gimbal actuator 138 may be configured to pivot the gimbal arm 136 within an angular range. For example, the gimbal actuator 138 may pivot the gimbal arm 136 within a range of zero to about eighty-five degrees. Pivoting of the gimbal arm 136 causes an orientation change between the propeller 132 and the body 110 or the propeller 132 and the wings 111 and 112. Moreover, pivoting of the gimbal arm 136 may pivot an axis of rotation of the propeller 132, referred to as the propeller axis. A propeller angle 154 may be defined as an angle between the propeller axis and the reference plane.

With reference to FIG. 2, the propeller 132 is shown in two positions (i.e., a forward directed position shown in solid line and a pivoted position shown in dotted line silhouette). In the forward directed position, the propeller axis is at axis 170 which is parallel with the reference plane 175. In this example, the propeller axis 170 is also in the reference plane 175. Due to the propeller axis 170 and the reference plane 175 being parallel, a propeller angle for the propeller axis 170 is zero degrees. As such, thrust formed by the propeller 132 with the propeller axis 170 is directed only rearward as indicated by arrow 156 (i.e., with no component in a downward direction contributing to lift). As shown in silhouette, at an eighty-five degree propeller angle 176, due to pivoting of the propeller gimbal 133, as indicated by the position of propeller axis 171 relative to the reference plane 175, the propeller 132 is oriented with an upward component (i.e., the propeller 132 has rotated towards a top surface of the UAV 100 and towards the vertical stabilizer 115). As such, the thrust formed by the propeller 132 when the positioned at an eighty-five degree propeller angle has a component in the rearward direction as indicated by arrow 157 and also in the downward direction as indicated by arrow 158. As such, the propeller 132 may contribute to lift of the UAV 100 when the gimbal actuator 138 moves the propeller 132 into a non-zero (and positive) position. Accordingly, the gimbal actuator 138 may be controlled to move the propeller 132 into any position where the propeller angle is between about zero and about eighty-five degrees.

As described further below, the functionality to pivot the propeller 132 via the propeller gimbal 133 can permit the fixed-wing UAV 100 to maneuver while in a high angle-of-attack attitude (e.g., at an angle-of-attack that is greater than about sixteen or seventeen degrees), where other fixed-wing UAVs may not be able to maintain flight. With reference to FIG. 3, the fixed-wing UAV 100 has been controlled by a UAV controller 510 (FIG. 4) operating the control surface assembly 120 to position the fixed-wing UAV 100 at a high angle-of-attack or stall attitude, and the propeller 132 has been pivoted into a non-zero propeller angle to maintain flight and maneuverability in this position. As shown in FIG. 3, the propeller angle 177 (defined between the reference plane 175 and the propeller axis 178) is about fifty-five degrees to create lift and maintain the UAV 100 in flight despite the high angle-of-attack. The thrust generated by the propeller 132, and indicated by arrows 159 is directed with a downward component to generate lift and maintain the UAV 100 above the ground 160 while in flight. According to some example embodiments, controlling the UAV 100 to assume a stall attitude or a high angle-of-attack attitude may also quickly reduce airspeed, which may allow for increased maneuverability (tight turning) at such low speeds. Such a high angle-of-attack attitude can therefore be utilized in collision avoidance. Additionally, such a high angle-of-attack attitude as shown in FIG. 3 may be also be utilized for vertical takeoff and vertical landing.

Referring back to FIG. 1, the fixed-wing UAV 100 may also include a sensor assembly 140. In the regard, according to some example embodiments, the sensor assembly 140 may include a plurality of sensors that may be used to detect the aspects of the environment, including obstacles or other characteristics of the fixed-wing UAV 100 to support flight operations, including, for example, autonomous flight operations. In this regard, according to some example embodiments, the sensor assembly 140 may include vision sensors that may support the identification of obstacles with the field of view of the vision sensors. Such vision sensors may also be leveraged to determine relative positioning of the UAV 100 (e.g., position of the UAV relative to a building and the like).

Examples of the vision sensors that may be able to determine a relative position of the UAV 100 may include cameras, LIDAR sensors, thermal sensors, lasers, other optical sensors, and the like). Additionally, according to some example embodiments, stereo sensing via two (or more) vision sensors may be performed to generate depth information (i.e., three-dimensional information). As further described below, such depth information may be utilized to determine real-time or flight-time flight trajectories as the fixed-wing UAV 100 maneuvers to a destination. As shown in FIG. 1, the fixed-wing UAV 100 includes two vision sensors indicated as vision sensor 141 on the right side of the body 110 (e.g., on a right side of the body 110 behind the propeller 132) and vision sensor 142 on the left side of the body 110 (e.g., on a left side of the body 110 behind the propeller 132). Based on the known distance between vision sensor 141 and vision sensor 142, depth information regarding the environment of the UAV 100 can be determined for synchronous image captures. Further, according to some example embodiments, the vision sensors 141 and 142 may be coupled within a singular package such as, for example, the Intel Realsense D455 camera. According to some example embodiments, the image captures from the vision sensor 141 and 142 may be down sampled and converted to point clouds to decrease computation requirements. Additionally, the field-of-view of the vision sensor 141 and 142 may be biased with a downward tilt to permit the vision sensors 141 and 142 to continue to capture useable information even when the UAV 100 is in a high angle-of-attack attitude.

Having described the various structural and mechanical operating elements of the UAV 100, reference is now made to block diagram of FIG. 4 illustrating the electrical control system 200 of the fixed-wing UAV 100. In the regard, a UAV controller 510 may control flight of the UAV 100. The UAV controller 510 may be configured to control an attitude of flight of the UAV 100 by controlling operation of the motor 131, the propeller gimbal 133, and the control surface assembly 120. The UAV controller 510 may also operate to control other components of the UAV 100 or retrieve information from sensors and the like. According to some example embodiments, the UAV controller 510 may include an assembly of interconnected active and passive electronic components. In some example embodiments, the UAV controller 510 may include a processor and a memory for executing firmware or software instructions. The memory may also be configured for use in storing information obtained from sensors, such as, for example, a history of depth information to support implementation of a direct NMPC function as described herein. Additionally or alternatively, the UAV controller 510 may include hardware configured processing devices such as field programmable gate arrays (FPGAs) or application specific integrated circuits (ASICs) configured to operate to support or perform the functionalities of the UAV controller 510 described herein.

The UAV controller 510 may be operably coupled to a motor controller 531 and a gimbal controller 533. In this regard, the motor controller 531 may be configured to receive signals form the UAV controller 510 and adjust the operation of the motor 131 based on the received signals. Via the motor controller 531, the UAV controller 510 may be configured to control the rotational speed of the motor 131 and, as a result, the rotational speed of the propeller 132 and the air speed of the UAV 100.

The gimbal controller 533 may be configured to receive signals from the UAV controller 510 and, in response, control the propeller gimbal 133 to change the propeller angle. In this regard, the UAV controller 510 may be configured to move the gimbal arm 136 based on gimbal control signals provided by the UAV controller 510. As such, the UAV controller 510 may be configured to control an angular position or the propeller angle of the propeller 132 via the gimbal controller 533. For example, the UAV controller 510 may be configured to control the propeller gimbal 133, via the gimbal controller 533, to pivot the propeller 132 between a first position where the propeller axis is parallel to the reference plane and therefore thrust generated by the propeller 132 does not contribute to lift, and a second position where the propeller axis is not parallel to the reference plane and thrust generated by the propeller 132 contributes to lift.

The electrical control system 200 may include a power source 526. The power source 526 may be directly connected to various components of the UAV 100 or components may be connected to the power source 526 via the UAV controller 510 as a power controller. The power source 526 may be, for example, a battery that may be recharged for repeated operation of the UAV 100.

The UAV controller 510 may also be operably coupled to a sensor assembly 527, which may include vision sensors 141 and 142, and GPS circuitry 528. The UAV controller 510 may be configured to interface with the vision sensors 141 and 142 to perform stereo depth sensing of the environment of the UAV 100 as mentioned above. As such, the UAV controller 510 may retrieve optical capture (e.g., video) information from the vision sensors 141 and 142, and analyze the information from both sensors holistically based on, for example, time correlations to generate depth information, and thus, distances to obstacles in the environment of the UAV 100. Moreover, according to some example embodiments, the UAV controller 510 may be configured to receive image captures from the first vision sensor 141 and the second vision sensor 142 and determine depth information based on the image captures. As described further below, the depth information may be used to perform real-time or in-flight flight trajectory determinations for the UAV 100, and the UAV controller 510 may be further configured to repeatedly update flight trajectories based on the depth information and historically stored depth information that was derived from previous image captures by the vision sensors 141 and 142. Additionally, according to some example embodiments, the vision sensors 141 and 142 may have a wide view with a center of the view directed at least partially downward, such that, when the UAV assumes a high angle-of-attack attitude, the vision sensors 141 and 142 may still be positioned to view the surrounding environment (i.e., are not pointed only towards the sky) to continue to capture useful environmental information.

Additionally, the sensor assembly 140 may include a GPS sensor 528, a gyroscope/accelerometer 529, and an air speed sensor 530. According to some example embodiments, the GPS (global positioning system) sensor 528 may be configured to determine an absolute position of the UAV 100. According to some example embodiments, the GPS sensor 528 may be configured to operate based on real-time kinematic (RTK) GPS, differential GPS, or the like to determine positioning of the UAV 100. According to some example embodiments, the GPS sensor 528 may use carrier-phase enhancement to obtain, for example, centimeter level position accuracy. In this regard, according to some example embodiments, a uBlox ZED-F9P carrier RTK GPS unit, for example, may be implemented and associated with an antenna, such as a helical multiband antenna. A radio, such as, for example, a RFD900+ telemetry radio, may be used to communicate with a base-station to provide GPS corrections.

The UAV controller 510 may be configured to interface with the GPS sensor 528 to determine a position of the UAV 100 in, for example, latitude and longitude coordinates. The gyroscope/accelerometer 529 may be a single component package or a collection of components that are configured to detect an attitude of the UAV 100. In this regard, the gyroscope/accelerometer 529 may provide information for roll, pitch, and yaw for the UAV. According to some example embodiments, the gyroscope/accelerometer 529 may also be used to determine altitude of the UAV 100. As such, the UAV controller 510 may interface with the gyroscope/accelerometer 529 to determine attributes of the UAV 100 in-flight including the attitude and altitude of the UAV 100. The sensor assembly 140 may also include an air speed sensor 530, which may be embodied as a pitot tube. The UAV controller 510 may be configured to interface with the air speed sensor 530 to retrieve information indicative of the air speed of the UAV 100.

According to some example embodiments, the electrical control system 200 may also include a communications interface 515. The communications interface 515 may be configured to perform wired or wireless communications with external devices. According to some example embodiments, the communications interface 515 may include a radio and an antenna for wireless communications. In this regard, according to some example embodiments, the UAV controller 510 may be configured to receive instructions or communicate information via the communications interface 515.

Additionally, the UAV controller 510 may be operably coupled to the control surface assembly 120 to control operation of the control surface assembly 120. In this regard, the control surface assembly 120 may also include actuators for each of the control surfaces of the control surface assembly 120. The UAV controller 510 may be configured to provide signals to the actuators to move the respective control surfaces into a desired position for performing maneuvers of the UAV 100. As such, the UAV controller 510 may be configured to control actuator 521 to move aileron 121, control actuator 522 to move aileron 122, control actuator 523 to move elevator 123, control actuator 524 to move elevator 124, and control actuator 525 to move the rudder 125. As such, collectively, the UAV controller 510 may control the various control surfaces of the control surface assembly 120 to perform, for example, post-stall, high angle-of-attack maneuvering in association with collision avoidance, vertical takeoff, and vertical landing, among other maneuvers. For example, the UAV controller 510 may be configured to control the control surface assembly 120 to cause the UAV 100 to enter a stall attitude or a high angle-of-attack attitude (e.g., the UAV controller 510 may operate the actuators to pull the forward end 101 upwards relative to the rearward end 102 during flight where the angle-of-attack is, for example, greater than seventeen degrees). Further, while in the stall or high angle-of-attack attitude, the UAV controller 510 may be configured to control the propeller gimbal 133 to pivot the propeller 132 into a position where the UAV 100 remains airborne despite maintaining the stall or high angle-of-attack attitude. Such a maneuver may be performed to maintain flight while at very low air speeds for a fixed-wing UAV, such as, for example, less than one mile per hour.

According to some example embodiments, the UAV controller 510 may be configured to implement an autopilot to support autonomous flight of the fixed-wing UAV 100. In this regard, according to some example embodiments, the autopilot functionality may be, for example, implemented via an mRobotics Control Zero F7 autopilot running an Ardupilot stack. The autopilot may interface with the UAV 100's powertrain and control surface actuators, and the autopilot may also provide full-state estimates of the UAV 100. Such state estimates may be determined by using, for example, an Extended Kalman Filter (EKF) to fuse sensor measurements from, for example, the gyroscope/accelerometer 529 and the air speed sensor 530, as well as from other sensors such as a magnetometer and a barometer.

Further, the UAV controller 510 may be configured to determine trajectories of flight for the fixed-wing UAV 100 based on a selected destination or goal point. In this regard, according to some example embodiments, the UAV controller 510 may be configured to determine an initial flight path to a goal point, and then repeatedly update a flight trajectory, for example, while the UAV 100 is in flight, based on the initial flight path or a prior flight trajectory, the dynamics model for the UAV 100, and the (NMPC) function. Further, according to some example embodiments, the updated flight trajectories may also be determined based on a collision constraint that may be defined, for example, based on attributes of the UAV 100 and its associated maneuverability. In this regard, as further described herein the collision constraint may be defined as a volume threshold around the UAV 100 (e.g., a spherical threshold) that defines a minimum distance to a detected obstacle that is permitted for determining a flight trajectory. Accordingly, flight trajectories, according to some example embodiments, may be initially determined as a direct route (or seed path) referred to as the initial flight path between a current position of the UAV 100, for example, as indicated by the GPS sensor 528, and the goal point or location for the task. However, as the UAV 100 takes flight, the UAV controller 510 may be configured to analyze the three-dimensional environmental information obtained via the vision sensors 141 and 142 operating in stereo. Such analysis by the UAV controller 510 may identify obstacles to avoid and, based on the identification of such obstacles, the UAV controller 510 may be configured to determine updated flight trajectories for arriving at the goal point, while avoiding the identified obstacles. Such updated flight trajectories may be determined in-flight and in real-time based on the environmental information from maps or sensors. To determine the flight trajectories, a dynamics model of the fixed-wing UAV 100 may be utilized with the direct NMPC function described herein. Since the fixed-wing UAV 100 may operate at a relatively high peak air speed, for such analysis and determinations to be performed, high maneuverability may be employed to avoid obstacles based on the updated flight trajectories. As such, the UAV controller 510 may be configured to determine such flight trajectories considering that post-stall, high angle-of-attack maneuvering is an option for the UAV 100 and the UAV controller 510 may control the control surface assembly 120 to execute such post-stall, high angle-of-attack maneuvering when necessary to execute the flight trajectory. As further described below, the UAV controller 510 may be configured to determine the updated flight trajectories and then control the motor 131, the propeller gimbal 133, and the control surface assembly 120 to execute continued flight in accordance with the updated flight trajectory. Such maneuvering based on the flight trajectory may involve controlling the control surface assembly 120 and the propeller gimbal 133 to facilitate the execution of in-flight obstacle avoidance. For example, the UAV controller 510 may be configured to execute a stall turn in accordance with a determined flight trajectory. In this regard, the UAV controller 510 may be configured to control the control surface assembly 120 to cause the UAV 100 to enter a stall (or high angle-of-attack) attitude, and while in the stall attitude, control the propeller gimbal 133 to pivot the propeller 132 into a position where the UAV 100 remains airborne despite maintaining the stall attitude. While in this position, the UAV controller 510 may control the control surface assembly 120 and the motor 131 to execute the turn (e.g., a small radius turn) while the UAV 100 is in the stall attitude, and then return to full forward flight via control of the propeller gimbal 133 subsequent to the turn. Additionally, execution of the flight trajectory may also include the UAV controller 510 repeatedly adjusting the propeller angle via the propeller gimbal 133, while in-flight, and in coordination with control of the control surface assembly 120 to perform maneuvers.

As mentioned above, the real-time or in-flight flight trajectory determination may be implemented by the UAV controller 510 based on a fixed-wing dynamics model for the configuration of fixed-wing UAV 100. According to some example embodiments, a planar post-stall fixed-wing aerial vehicle model can be extended into a three-dimensional dynamics model to arrive at such a model. According to some example embodiments, the position and configuration of the propeller may be a factor of the dynamics model, with the description below considering a propeller in a puller configuration as provided with the fixed-wing UAV 100. Accordingly, the state of the aerial vehicle may be defined as:

$$x = [r_x, r_y, r_z, \phi, \theta, \psi, \delta_{ar}, \delta_e, \delta_r, \delta_t, v_x, v_y, v_z, \omega_x, \omega_y, \omega_z]^T. \quad (1)$$

Here $r=[r_x, r_y, r_z]^T$ represents the position of the center of mass of the aerial vehicle (e.g., the fixed-wing UAV 100) in the world frame $O_{x_w y_w z_w}$, $\theta=[\phi, \theta, \psi]^T$ represents the set of x-y-z Euler angles applied in a ZYX intrinsic rotation sequence, and $\delta=[\delta_{ar}, \delta_e, \delta_r]^T$ are control surface deflections for the right aileron, elevator, and rudder, respectively. The left aileron deflection may be treated as a dependent parameter, with $\delta_{al}=-\delta_{ar}$. $\delta_t$ is the magnitude of thrust from the propeller, $v=[v_x, v_y, v_z]^T$ is the velocity of the center of mass in the world frame, and $\omega=[\omega_x, \omega_y, \omega_z]^T$ is the angular velocity of the body in the body-fixed frame $O_{xyz}$. As such, $x=[r, \theta, \delta, \delta_t, v, \omega]^T$ and $u_{cs}=[\omega_{ar}, \omega_e, \omega_r]^T$. According to some example embodiments, a depiction of an example fixed-wing aerial vehicle 550 is shown in FIG. 5 with the main coordinate frames used for this dynamics model. The equations of motion may then become:

$$\dot{r} = v \quad (2)$$

$$\theta = T_\omega^{-1} \omega \quad (3)$$

$$\dot{\delta} = u_{cs} \quad (4)$$

$$\dot{\delta}_t = a_t \delta_t + b_t u_t \quad (5)$$

$$\dot{v} = R_b^r f / m \quad (6)$$

$$\dot{\omega} = J^{-1}(m - \omega \times J\omega). \quad (7)$$

Here m is the mass of the vehicle or aerial vehicle, J is the vehicle's inertia tensor with respect to the center of mass, f are the total forces applied to the vehicle in body-fixed coordinates, m are the moments applied about the vehicle's center of mass in body-fixed coordinates, and $u_{cs}$ are the angular velocity inputs of the control surfaces. $R_b^r$ denotes the rotation of the body-fixed frame with respect to the world frame, and $T_\omega$ is the transformation which maps the Euler angle rates to an angular velocity in body-fixed frame. Additionally, the velocity in the body-fixed frame may be defined as $$v_b = R_b^{rT} v$$

for notational simplicity. The forces acting on the vehicle can be written in the body-fixed frame as:

$$f = \sum_i [R_{s_i}^b f_{s_i}] - mg R_b^{rT} e_z + R_t^b f_t + f_d, \quad (8)$$

where $f_{s_i}$ represents the force due to each aerodynamic surface in the surface frame $O_{x_s y_s z_s}$ and $f_t$ represents the force due to the propeller and is given as $f_t=[\delta_t \ 0 \ 0]^T$. g is the acceleration due to gravity, and $f_d$ is a drag force which compensates for additional observed profile drag.

$$R_t^b$$

is the rotation matrix that defines the orientation of the thrust source with respect to the body-fixed frame.

$$R_{s_i}^b$$

is the rotation matrix that defines the aerodynamic surface reference frame (in which the z axis is the surface normal) with respect to the body-fixed frame. The aerodynamic surfaces used for the model can be the wing, the horizontal and vertical body or fuselage, the horizontal and vertical stabilizers, and the control surfaces.

To model forces on the aerodynamic surfaces, the following may be used:

$$f_{s_i} = f_{n,s_i} e_z = \frac{1}{2} C_{n_i} \rho |v_{s_i}|^2 S_i e_z, \quad (9)$$

where $\rho$ is the density of air, $S_i$ is the surface area, and $v_s$, is the velocity of the $i^{th}$ aerodynamic surface in the surface frame given as:

$$v_{s_i} = R_{s_i}^{bT} (v_b + \omega \times r_{h_i} + \gamma_i v_{bw}) + (R_{s_i}^{bT} \omega + \omega_{s_i}) \times r_{s_i}. \quad (10)$$

Here $r_{h_i}$ represents the displacement from the vehicle center of mass to a point on the aerodynamic surface that is stationary in the body-fixed frame. For control surfaces, this point may be located at the center of the axis of rotation between the aerial vehicle body and the control surface. For static aerodynamic surfaces, this point may be located at the surface centroid. $r_{s_i}$ represents the displacement from the hinge point to the surface center of pressure in the surface frame, and $\omega_{s_i}$ is the simple rotation rate of the aerodynamic surface in the aerodynamic surface frame, which is only non-zero for actuated surfaces. $v_{bw}$ is the velocity due to the backwash of the propeller, which can be approximated using actuator disk theory as $$v_{bw} = \left[ \sqrt{\|v_p\|_2^2 + \frac{2\delta_t}{\rho S_{disk}}} - \|v_p\|_2 \right] e_x, \quad (11)$$

where $S_{disk}$ is the area of the actuator disk and $v_p$ is the freestream velocity at the propeller. $\gamma$ is an empirically determined backwash velocity coefficient. $C_{n_i}$ comes from a flat plate model and may be given as:

$$C_{n_i} = 2\sin \alpha_{s_i} \quad (12)$$

$$\alpha_{s_i} = \arctan \frac{v_{s_i,z}}{v_{s_i,x}}, \quad (13)$$

where $\alpha_{s_i}$ is the angle of attack for the $i^{th}$ aerodynamic surface. m in the body-fixed frame can be given as:

$$m = \sum_i (l_{s_i} \times R_{s_i}^b f_{s_i}), \quad (14)$$

where $$l_{s_i} = r_{h_i} + R_{s_i}^b r_{s_i}$$

is the vector from the vehicle center of mass to the surface center of pressure in the body-fixed frame. To model the thrust dynamics, a first order linear model can be used for the thrust as given in equation (5) where $a_t$ and $b_t$ are constants and $u_t$ is the normalized control signal for the motor, $u_t \in [0, 1]$.

To account for unmodeled profile drag, the drag term may be added:

$$f_d = -\frac{1}{2} C_{b_d} \rho |v_b|^2 \frac{v_b}{|v_b|}, \tag{15}$$

where $C_{b_d}$ can be determined empirically.

Having described the definition of an example dynamics model for the UAV 100, aspects of the control strategy for operating the UAV 100 can now be described that leverage the dynamics model. In this regard, to achieve real-time planning for fixed-wing UAVs across the entire flight envelope, a four-stage, hierarchical control strategy may be implemented by the UAV controller 510. The strategy may include implementation of a randomized motion planner, a spline-based smoothing algorithm, direct trajectory optimizer, and local linear feedback control. The spline-based smoothed path may be used as a seed to the direct trajectory optimizer. The spline-based smoothing algorithm may also determine a receding horizon goal point. A local linear feedback controller may, according to some example embodiments, compensate for model-uncertainty and environmental disturbances between plans. In this regard, the flowchart 600 of FIG. 6 illustrates the operations, according to some example embodiments, to perform such a control strategy.

In general, a motion planner 605 may be implemented that outputs updated trajectories for the UAV 100. Such updated trajectories may be provided to a feedback controller 610 to determine a new aerial vehicle state based on the updated trajectories and a current aerial vehicle state. The new aerial vehicle state may be provided as feedback to the feedback controller 610 to determine future states and may also be provided to the motion planner 605 to determine new updated trajectories. The motion planner 605 may use the current aerial vehicle state as an input and, based on the current aerial vehicle state a randomized motion planner 615 may be implemented that uses rapidly-exploring random trees (RRT) to determine a seed path. Additionally, a future state predictor 620 may operate based on the current aerial vehicle state (x) to determine a future state ($x_{k+1}$). The seed path and the future state may be inputs to a direct nonlinear model predictive control (NMPC) trajectory generator 625, which provides the updated trajectories for the UAV 100 as an output. As mentioned above, these updated trajectories may be provided to the feedback controller 610 and, more specifically, a time-varying linear quadratic regulator (LQR) controller 630, which generates control inputs (u) based on the updated trajectories and the current aerial vehicle state. The control inputs may be provided to a plant dynamics module 635 and a motion capture system 640 to generate a next or new aerial vehicle state for provision to the time-varying LQR controller 630 and the motion planner 605.

In the context of the motion planner 605, randomized motion planning may be performed by the randomized motion planner 615. Such randomized motion planning may be used as an effective strategy for generating motion plans for the UAV 100 in complex environments and in the presence of local minima. Rapidly-exploring Random Trees (RRTs) can be used as a powerful tool for solving path planning problems. However, RRTs can exhibit poor performance when required to reason about dynamical systems with large state-spaces. As such, according to some example embodiments, the UAV controller 510 may utilize a simplified three-state model to plan a collision-free "flight path" by leveraging a rapidly exploring random tree in three dimensions.

According to some example embodiments, an arbitrary three-dimensional mesh of an environment of the UAV 100, based information provided by the vision sensors 141 and 142, may be initially used to perform voxelization. The voxelized mesh may then be converted to a binary occupancy tree, and a three-dimensional probabilistic mapping framework, such as, for example, OctoMap, may be used to provide information about proximity to obstacles. While an initial flight trajectory (or seed path) generated by this process may not provide a feasible path for the UAV 100 to follow (e.g., due to later discovered obstacles), the UAV controller 510 may be configured to attempt to provide a receding-horizon goal point for a next stage of the motion planner 605, which may assist the trajectory optimizer avoid local minima.

In some instances, a map of the environment may be available, and therefore motion planning may be performed by the UAV controller 510 based on such a map. In this regard, a flight path may be generated through an implementation involving a combination of standard RRT, spline-based smoothing satisfying a maximum curvature constraint, and a final re-parameterization of the flight trajectory. The combination of such operations, according to some example embodiments, may provide a path which can be more dynamically feasible than a raw RRT and such combination may also operate to intelligently select a goal point for the trajectory optimizer.

Accordingly, an RRT may be initially grown in a three dimensional state space with, for example, a 10% bias towards the goal point, until the RRT arrives within an error ball around the goal. The resultant path $x=[x_0, x_1, \ldots, x_n]$ from a start point to the goal point may then be pruned by the UAV controller 510 to remove extraneous nodes.

A G2 Continuous Cubic Bezier Spiral Path Smoothing (G2CBS) may then be employed to obtain a continuous curvature, smooth path by examining each set of three adjacent nodes $[W_1, W_2, W_3]$ in the pruned path. The smoothing may transform the nodes into a local two dimensional space, compute control points for two symmetric G2 splines satisfying a maximum curvature constraint $\kappa_{max}$ (set to 2 m$^{-1}$), and then transform the control points back into three dimensional space. The output of the smoothing may be a set of three-dimensional control points for each spline, $$B_c = [\, B_0 \quad B_1 \quad B_2 \quad B_3 \,] \in \mathbb{R}^{3 \times 4} \tag{16}$$

$$E_c = [\, B_3 \quad B_2 \quad B_1 \quad B_0 \,] \in \mathbb{R}^{3 \times 4} \tag{17}$$

A 3rd order Bezier curve can be evaluated by $$F(s) = (1-s)^3 P_0 + 3(1-s)^2 P_1 \dots + 3(1-s)s^2 P_2 + s^3 P_3, \qquad (17)$$

$$s \in [0, 1]$$

where $[P_0, \dots, P_3]$ is the set of control points for the spline. This expression permits evaluation of the B and E splines represented by the control points $B_c$ and $F_c$, and stitching together of the overall G2 continuous path x, which may include straight line segments and spline segments.

According to some example embodiments, the approach described above may be extended to compute the curvature of the entire path, in order to apply a rough kinematic mapping between curvature and velocity. Such mapping may permit reparameterization of the flight path in terms of time. Via selection of an endpoint for the trajectory optimizer based on a constant time along the seed path, the duration of the optimized flight trajectory may be regularized. Accordingly, computational resources may be conserved by avoiding planning too far into the future and also provide a feasible estimate of final velocity to the solver. The first and second order derivatives of F may be computed with respect to s, F' and F". As such, the individual elements may be removed as $$F'(s) = [\, x' \quad y' \quad z' \,], \, F''(s) = [\, x'' \quad y'' \quad z'' \,] \qquad (18)$$

and the curvature along F(s) may be expressed as $$\kappa = \frac{\sqrt{(z''y' - y''z')^2 + (x''z' - z''x')^2 + (y''x' - x''y')^2}}{\left(x'^2 + y'^2 + z'^2\right)^{\frac{1}{2}}} \qquad (19)$$

with the curvature along the straight segments of the path being equal to 0. The curvature along the entire path may then be mapped to velocity as $$v(s) = \frac{dx}{dt}(s) = v_{max} - \kappa(s) * m, \, s \in [0, s_p], \qquad (20)$$

where x(s) is the full path as a function of s, $v_{max}$ is the maximum velocity for the kinematic model, m is the linear kinematic mapping parameter which relates curvature to velocity derived from l, and $s_p$ is the overall path length. Reparameterization by time may be performed with $$t = \int_0^s \frac{1}{v(s)} ds, \, s \in [0, s_p], \qquad (21)$$

which yields a numerically solvable relationship between t and s. For selection of an endpoint to feed into the trajectory optimization operation, the position and velocity equations may be evaluated at the time horizon $T_H$.

Additionally, direct trajectory optimization formulates the nonlinear optimization problem by including both inputs and states as decision variables. A collocation or transcription of the dynamics may then be used to constrain the variables to ensure dynamic feasibility. As a result, direct trajectory optimizers may be used to accept a set of state variable initializations. According to some example embodiments, a direct transcription formulation of an integration rule may be used and a feasibility problem may be formulated with the objective being to ensure dynamic feasibility of the flight trajectory and collision avoidance. To solve the direct trajectory feasibility problem, a Sparse Nonlinear Optimizer (SNOPT) may be used. Collision avoidance may be formulated as a non-penetration constraint on an occupancy grid. In general, the implicit integration constraints may require far fewer knot points, provide good numerical stability, and offer improved performance over spline-based collocation constraints.

Accordingly, the feasibility problem may be expressed as $$\min_{x_k, u_k, h} 0 \qquad (22)$$

$$\text{s.t. } \forall \, k \in [0, \dots, N] \text{ and}$$

$$x_k - x_{k+1} + \frac{h}{6.0}(\dot{x}_k + 4\dot{x}_{c,k} + \dot{x}_{k+1}) = 0$$

$$x_f - \delta_f \le x_N \le x_f + \delta_f$$

$$x_i - \delta_i \le x_0 \le x_i + \delta_i$$

$$x_{min} \le x_k \le x_{max}, \, u_{min} \le u_k \le u_{max}$$

$$d(x) \ge r$$

$$h_{min} \le h \le h_{max}$$

where $$\dot{x}_k = f(t, x_k, u_k), \, \dot{x}_{k+1} = (t, x_{k+1}, u_{k+1}) \qquad (23)$$

$$u_{c,k} = (u_k + u_{k+1})/2$$

$$x_{c,k} = (x_k + x_{k+1})/2 + h(\dot{x}_k - \dot{x}_{k+1})/8$$

$$\dot{x}_{c,k} = f(t, x_{c,k}, u_{c,k}).$$

In this regard, x signifies the system state and u is the vector of control actions. h is the time step bounded from $h_{min}=0.001$ s to $h_{max}=0.2$ s. $\delta_f$ and $\delta_i$ may represent the bounds on the desired final and initial states ($x_f$, $x_i$), respectively. N is the number of knot points. The minimum distance function d may be generated using a distance map computed from a map such as, for example, an OctoMap.

To control the aerial vehicle, via the local linear feedback control, to a flight trajectory between plans, a time-varying LQR (TVLQR) may be used. The control action may be given as $$u(t, x) = K(x - x_0(t)) + u_0(t). \qquad (21)$$

K(t) is the time-dependent feedback gain matrix and may be found by integrating $$-\dot{S}(t) = A(t)^1 S(t) + S(t)A(t) \dots - S(t)B(t)R^{-1}B(t)^T S(t) + Q \qquad (25)$$

backwards in time from t=T to t=0. Further, $$A(t) = \frac{\partial f(x_0, u_0(t))}{\partial x}, \, B(t) = \frac{\partial f(x_0(t), u_0(t))}{\partial x},$$

and $$K(t) = R^{-1}B(t)^T S(t). \tag{26}$$

Also, $x_0(t)$ and $u_0(t)$ may signify the nominal trajectories. Q and R may be the weighting matrices for state and action respectively. S(t) may be defined by a final cost matrix $Q_f$.

According to some example embodiments, to compute a flight trajectory, an integration method may be used. In this regard, for example, a Euler integration method or a Hermite-Simpson integration method may be used. However, in some instances, a Euler integration method may require additional knot points relative to a Hermite-Simpson integration method, and therefore the Hermite-Simpson integration method may be preferable. According to some example embodiments, a Hermite-Simpson integration method may be implemented using, for example, 10 knot points resulting in desirable computational performance and flight trajectory following.

Additionally, according to some example embodiments, the UAV controller 510 may be operably coupled to the sensor assembly 140, and, to facilitate interfacing with the sensors and support eventual multi-vehicle operations, a modular UAV flight autonomy stack may be used. An example of an autonomy stack may be referred to as ACCIPITER (Aerobatic Control and Collaboration for Improved Performance in Tactical Evasion and Reconnaissance). Such an autonomy stack may leverage a Robot Operating System (ROS) and provide a ROS node for each component required for flight control, including, for example, a controller, estimator, simulator, and hardware interface. According to some example embodiments, the autonomy stack may be designed to support the modeling, simulation, and control of electric-powered propeller-driven UAVs. To design the stack, a Universal Robot Description Format (URDF) provided by the ROS may be employed to specify robot kinematics and dynamics, which may be extended to create a Universal Aerial Robot Description Format (UARDF). The UARDF may include specifications for aerodynamic surfaces and thrust sources to model the dynamics of the fixed-wing UAV 100. The UARDF may also facilitate interfacing with the autonomy stack (e.g., ACCIPITER) by properly initializing a hardware interface node with a control surface and throttle configuration.

Because the autonomy stack may be built using the ROS, the framework implemented by the UAV controller 510 may support inter-process communication and may allow sharing of information with other UAVs that implement the autonomy stack, with such information including state information or planned flight trajectories. The autonomy stack may also support combining control modes with different cost-functions into a simple state machine. Transitioning to a different control mode, and thus a different cost function, may only be permitted at the beginning of a planning interval so as to ensure the existence of a prior nonlinear programming (NLP) solution, for example, for warm starting.

According to some example embodiments, the UAV controller 510 may also be configured to perform wind compensation. In this regard, according to some example embodiments, the autopilot (e.g., Ardupilot) state estimator may be configured to provide wind estimates. Airspeed sensing and ground speed measurements may be fused to estimate the wind state. The wind estimates may be integrated into the dynamics model and thereby incorporated in the analyses performed for planning and control. Since wind estimates may change relatively slowly, an assumption can be made that the estimates are constant over the planning horizon (e.g., about 1 second). With such wind compensation, a significant reduction in the aerial vehicle oscillations, especially in roll, can be realized in the presence of a headwind relative to implementations that do not include wind compensation.

According to some example embodiments, as an alternative to using map information for routing, the UAV controller 510 may use a vision-based approach that is not based on an a priori map, but still leverages use of the direct NMPC. In place of an a priori map, a collision avoidance approach may be performed by leveraging a search-over-views approach for pose uncertainty within a local history of depth information captured and stored locally on the UAV 100. An example of such an approach is NanoMap as described in NanoMap: Fast, Uncertainty-Aware Proximity Queries with Lazy Search over Local 3D Data, 2018 *IEEE International Conference on Robotics and Automation (ICRA)*, Florence, Carter, Ware, and Tedrake (2018) which is incorporated by reference in its entirety. As such, the pose uncertainty approach or algorithm may be leveraged for collision avoidance, and position information may be determined from the GPS Sensor 528, which may be configured to use GPS-RTK to determine the position of the fixed-wing UAV 100. As a result, the UAV controller 510 may generate and store a type of real-time map for use in collision avoidance based on depth information provided by the vision sensors 141 and 142.

For real-time map generation, the pose uncertainty algorithm, e.g., NanoMap, may provide a framework that is computationally tractable to query and to generate. In this regard, an asynchronous history of depth information and possible associated poses may be maintained, for example, within a memory of the UAV controller 510. Such a history may be accumulated through the capture and analysis of image capture data provided by, for example, the vision sensors 141 and 142. As such, the UAV controller 510 may be configured to use real-time captured image data in a query against the history of depth information and associated poses. The pose uncertainty algorithm may then perform a reverse search through the asynchronous history that is stored locally on the UAV 100 (e.g., as part of the UAV controller 510) to find and match a satisfactory depth image, and return the k-nearest depth points to a query point to facilitate the detection, mapping, and distancing of an obstacle. Additionally, according to some example embodiments, state uncertainty may be propagated through the local history of depth information using the transformations between poses in the history. Additionally, for the control strategy, the pose uncertainty algorithm query replies may include the transformation from the query body frame to the current body frame, which may be implemented to calculate obstacle constraint gradients.

Further, the query replies may include information about the field of view status of the query point. This information may specify whether the query point is in free space, occluded space, or outside of the field of view of depth information. If the query point was not within the field of view free space of any prior depth measurements, then the query point would have no valid corresponding depth measurement. As a result, obstacle points may be pulled from a most recent depth measurement to determine a distance to the query point and the associated possible obstacle. According to some example embodiments, the pose uncertainty algorithm may return the K-nearest obstacle points from the most recent occluded field of view instead, which can yield more accurate nearest obstacle points, especially while planning through occluded space.

According to some example embodiments, the UAV controller 510 may also be configured to perform dynamic RRT generation. In this regard, as described above, a rapidly-exploring random tree (RRT) can be used to generate global paths to the goal for horizon point selection. The RRT can be expanded until the goal point is connected to the tree, and the path from the current position to the goal position can be extracted. The resulting path may be iteratively pruned, smoothed with Bezier curves, and parameterized in terms of time. The final smoothed path may be referred to as the smoothed RRT path, and the smoothed RRT path may be used to select a receding horizon point for flight trajectory generation.

However, the approach described above, can pose a problem for planning in unknown environments because the horizon point may be in or behind an unobserved obstacle. Such a situation is undesirable because the direct trajectory optimization problem may be warm-started with a previously generated flight trajectory. If a previously generated flight trajectory becomes intersected by newly obtained map data, the optimizer may often be unable to find a feasible solution. To avoid such an outcome, the RRT path may be constrained to known regions of the map. An example of such an algorithm is provided as Algorithm 1, below.

---

Algorithm 1: RRT($x_{init}$, $x_{goal}$, $\Delta x$, map, K, $\Delta t$)

```
τ.init(x_init), f ← [ ]
for k = 1 to K do
    |    x_rand ← RANDOM_STATE( )
    |    x_near ← NEAREST_NEIGHBOR(x_rand, τ)
    |    u ← SELECT_INPUT(x_rand, x_near)
    |    x_new ← NEW_STATE(x_near,u,Δt)
    |    if PATH_OBST_FREE(x_near,x_new, map) then
    |    |                τ.add_vertex(x_new)
    |    |                τ.add_edge(x_near,x_new,u)
    |    |                if DISTANCE(x_new, x_goal) ≤ Δx then
    |    |                |                x_goal ← x_new
    |    |                |                break
    |    |                if IS_FRONTIER_NODE(x_new, map) then
    |    |                |                f.add(x_new)
    |    |
    |    |
    |
if x_goal not in τ or IN_UNKNOWN(x_goal, map) then
    |    x_goal ← x_f ← x_goal.FIND_CLOSEST(f)
Return τ, x_goal
```

---

In this regard, as the tree expands, a list of frontier nodes (which exist in unknown space and connect to nodes in known space) may be maintained. A node may be in a known region of the map if the query returns a field of view status indicating that the query point is in free space. If the goal point is not connected to the tree, or if the goal point is in an unknown region of the map, then the frontier node closest to the goal position may be used as the goal instead.

At each control iteration, a truncated version of the prior RRT path may be used to initialize the RRT. This truncation may be based on both the updated vehicle state and any newly detected obstacles. The beginning of the RRT path may be truncated to minimize the distance between the start of the path and the vehicle state. Additionally, the end of the path may be truncated to ensure that the path does not intersect with obstacles. Reuse of the prior path in this manner can reduce the RRT computation time and also provide a more gradual evolution of the RRT path. A more incremental update of the receding horizon goal point may be achieved and a reduced computational burden for the warm-started trajectory optimization routine may be realized.

Additionally, according to some example embodiments, collision constraints may be defined for collision avoidance. For example, a distance-to-obstacles collision constraint may be defined with noise compensation via covariance inflation. Alternatively, a probability of collision constraint may be employed, but may have a higher computational cost. The distance-to-obstacles constraint may be formulated as $d(x) \geq r$, where r is the obstacle radius. Given the query, x, and the K=10 nearest neighbors $a_i$, the distance to each nearest neighbor can be determined as $d(x)_i = \|x - a_i\|$. The distance-to-obstacle constraint may be determined as the average distance to the nearest neighbors $$d(x) = \frac{1}{K} \sum_{i=1}^{K} (d(x)_i).$$

Additionally, the gradient for this distance-to-obstacle constraint may be determined as $$\nabla d(x) = \frac{1}{K} \sum_{i=1}^{K} \left( \frac{x - a_i}{\|x - a_i\|} \right).$$

Referring to FIG. 7, a visualization 700 of depth information is provided. As described above, the depth information may be generated based on captured images from the vision sensors 141 and 142. In this regard, the visualization shows that the farthest detections are occurring in the general region 710 which includes the building and trees. The regions at the lower portion are closer with the general region 720 being an intermediate distance and the general region 730 being a closest distance.

As mentioned above, an initial flight trajectory, which may also be referred to as the global path plan, may be determined without regard to obstacles since no map information is initially known to the UAV 100. As such, the initial flight trajectory 740 is shown with a heading directly at the building. However, based on the depth information and the initial flight trajectory, the UAV controller 510 may determine a new flight trajectory to avoid obstacles that are being revealed within the depth information, such as, the building. As such, accounting for the associated depth information, the new flight trajectory 750 may be determined which is showing the beginning of a turn to avoid the building as an obstacle. As the UAV 100 comes closer to the building, further flight trajectory updates may be determined to continue the turn away from the building as a collision avoidance. At some point, a collision constraint may be reached, possibly creating the need for a very small radius turn, which may require inducing a stall or moving into a high angle-of-attack attitude to achieve such a turn as shown in FIG. 8. In FIG. 8, a UAV 810 has entered a stall or high angle-of-attack to perform a maneuver around the corner of the building 820.

According to some example embodiments, the UAV controller 510 may also be configured to perform object detection at high speeds and at unconventional (e.g., high angle-of-attack) attitudes with stereo sensing via the vision sensors 141 and 142. In this regard, according to some example embodiments, markers placed on objects or targets can be detected and mapped as the UAV 100 is in flight and encountering the markers.

Further, according to some example embodiments, the UAV controller 510 may also be configured for swarm operation to control the flight of the fixed-wing UAV 100 as one of a plurality of UAVs in the swarm. According to some example embodiments, the UAV controller 510 may be configured to perform such swarm operation in high-density obstacle environments such as urban environments. While the techniques described above may be implemented in such an application, additional challenges arise in high-density obstacle environments and with swarm system integration.

One challenge is the need to be able to reliably perform launch and recovery of fixed-wing UAVs, such as the fixed-wing UAV 100. To do so, implementation of the NMPC function or algorithm may be leveraged in combination with operation of the propeller gimbal 133 to implement post-stall, high angle-of-attack takeoff and landing. A second challenge is the need to conduct multi-UAV collision avoidance at high speeds. Again, the NMPC function may be leveraged to conduct such high-speed collision avoidance. An additional challenge is being able to plan and deploy UAVs as part of large heterogeneous swarm, which may be performed via use of a swarm framework such as, for example, the Command and Control of Aggregate Swarm Tactics (CCAST) swarm framework.

To avoid the need for human involvement or runway space for takeoffs, example embodiments of the fixed-wing UAV 100 may include the functionality to implement automatic vertical takeoff or landing for a fixed-wing UAV. To do so, post-stall, high angle-of-attack flight positions may be utilized. Via the active propeller gimbal 133, a high thrust-to-weight ratio can be leveraged for automatic takeoff. In this regard, according to some example embodiments, the propeller gimbal 133 may employ, for example, an actuator in the form of a single servo at the forward end 101 of the fixed-wing UAV 100 to achieve thrust-vectoring of a single propeller for rapid takeoff with minimal added weight. In this manner, short launch durations for light-weight UAVs (e.g., one second) can be realized due to the fixed-wing UAV's simplified dynamics and the ability to change the propeller angle relative to the body to be various angles, such as, sixty degrees.

In this regard, upon activation of a takeoff procedure, the UAV controller 510 may control the motor 131 to rotate the propeller 132 at low speed and control the propeller gimbal 133 to assume an initial propeller angle of eighty-five degrees above the horizon (i.e. relative to the reference plane). According to some example embodiments, after a short delay, the motor 131 may be controlled to transition to full power (maximum rotation speed) and, as the UAV 100 pitches up into a stall attitude due to the propeller angle, the propeller gimbal 133 may be controlled to maintain a constant eighty-five degree propeller angle. Once the fixed-wing UAV 100 exceeds a specified pitch angle (e.g., angle-of-attack) of fifty-five degrees (at which the UAV 100 has a slightly positive vertical thrust-to-weight ratio), the desired angle for the propeller gimbal 133 may be reset to a fifty-five degrees propeller angle. A Linear Quadratic Regulator (LQR) may be used to generate control surface commands which stabilize the plane in a fifty-five degree climb. Once the aerial vehicle reaches a threshold altitude, the NMPC function may be employed to transition the UAV 100 into forward flight.

With respect to automatic landing similar challenges arise. Again, manually landing fixed-wing UAVs, or executing landings that require long, flat runways will not scale to swarm scenarios. Therefore, the same receding-horizon NMPC function may be leveraged to execute precision deep-stall landings. Additionally, the UAV controller 510 may be configured to optimize full three-dimensional trajectories for a receding-horizon deep-stall maneuver in real-time. To achieve these landings, the UAV controller 510 may plan a landing approach to eliminate the tail-wind component. The UAV controller 510 may then execute a post-stall maneuver to transition into a high angle-of-attack regime to slowly descend along a nominal flight path to a target landing site.

Additionally, for multi-UAV collision avoidance, a trajectory obstacle constraint may be added to the nonlinear optimization problem being solved online by each UAV. As such, the UAVs may share trajectories with the swarm and each UAV may maintain a "trajectory obstacle map" that indicates the planned future positions of the members of the swarm. For every flight trajectory in the trajectory obstacle map, a spherical collision object may be associated with each knot point in the flight trajectory. The trajectory optimizer may query the trajectory obstacle map during every planning interval to evaluate a minimum distance constraint and associated gradient. For collision avoidance, a decentralized approach may be employed, where each UAV plans online asynchronously based on the current known set of trajectory obstacles. The UAVs can re-plan fast enough to ensure collision-free flight, even though they do not solve a joint trajectory optimization problem.

To support large-scale swarm operations with swarm system integration, the autonomy stack described above may be integrated with the swarm framework, e.g., the CCAST framework. The UAV 100 may be able to receive mission commands from the swarm framework and share information on a network (e.g., the LTE network), for example, via a ROS interface. To connect to the network, a network modem may be included on the UAV 100.

Additionally, a pre-computed flight path may be used to set up the receding-horizon goal point for the NMPC function. For example, for a building-scan tactic, the flight plan may include of a path that connected the launch site to, for example, the building of interest. Instead of specifying the path itself, a swarm commander unit could assign a particular building scan mission to a particular UAV at run-time. When a fixed-wing UAV detects a, for example, a fiducial marker, the detection and marker position may be sent back across the network to the base station and displayed, for example, on a map. Planned trajectories for aerobatic fixed-wing swarm members may be passed over the network and stored in each aerial vehicle's trajectory obstacle map.

In view of the foregoing, real-time receding horizon control method with fixed-wing UAVs is described, according to some example embodiments, that can exploit post-stall, high angle-of-attack aerodynamics to make tight turns in constrained environments. Successful performance of the example method on hardware in indoor environments using off-board sensing and processing has been performed. Further, the example method has also been implemented in outdoor urban environments using onboard processing, and in outdoor environments while using stereo vision for collision-free navigation. Further, the example method can be formulated to support other important multi-vehicle operations, including automatic takeoff, landing, and vehicle-vehicle collision avoidance.

Implicit integration constraints being used as part of the trajectory optimization approach are also described according to some example embodiments. Implicit integration constraints can allow for both stable numerical performance and improved flight trajectory tracking error for a fewer number of knot points. Furthermore, direct methods can allow for a straightforward means of encoding collision avoidance via path constraints. The generalizability and flexibility of the NMPC function has been tested and shown to be effective. Not only is the NMPC function, according to some example embodiments, effective in a complex nonlinear system using an analytical dynamics model, but the approach can support a wide variety of different behaviors by shaping costs and constraints.

Various example embodiments described above, rely upon the UAV 100's ability to execute post-stall, high angle-of-attack turning. To highlight this maneuverability (i.e., low turning radius) the following describes the performance of the UAV 100 in such a turn, according to some example embodiments. A trim condition may be analyzed for a simplified dynamics model described above. By assuming direct control of the vehicle's Tait-Bryan angles, θ, zero vertical velocity, and restricting the motion of the UAV to a circular arc, the steady state trim condition can be written as $$c(\theta, v, r, f_t) = R_b^r f_a^b + R_b^r f_t^b + g - a = 0. \tag{27}$$

Letting $e_{x,y,z}$ be the unit vectors in the body fixed frame and $e_{r,\theta,z}$ be the unit vectors in polar coordinates along the turn, the following can be written $$f_t^b = f_t e_x \tag{28}$$

$$g = -mg e_z$$

$$a = -\frac{m v_\theta^2}{r} e_r,$$

where $$f_t^b$$

is the thrust force in the body fixed-frame, g is the gravity force, a is the centrifugal force, and $$R_b^r$$

is the rotation matrix from the body frame to the world frame. $f_t$ is the total thrust force, m is the vehicle mass, g is the gravitational constant, $v_\theta$ is the vehicle's transverse speed, and r is the radius of the turn. For a fixed-wing, the body aerodynamic forces are derived according to flat plat theory as $$f_a^b = \rho S v_\theta^2 \sin(\alpha) e_z, \tag{29}$$

where S is the wing area and ρ is the density of air. The quadrotor may be approximated as a sphere with drag determined as $$R_b^r f_a^b = \frac{-\rho S v_\theta^2}{4} e_\theta. \tag{30}$$

Here S is the projected area of the sphere. For the low angle-of-attack fixed-wing flight regime, the following can be written $$R_b^r f_a^b = \rho S v_\theta^2 (C_L n_L + C_D n_D), \tag{31}$$

where $n_L$ and $n_D$ are the unit vectors in the lift and drag directions respectively. The lift and drag coefficients $C_L$ and $C_D$ come from a linear and quadratic approximation of the lift and drag coefficients for a NACA 2412 airfoil. A constraint can be added on the angle-of-attack, $\alpha \le \alpha_{crit}$, where $\alpha_{crit}$ is the critical angle-of-attack.

For this simplified dynamics model, feasible trim conditions exist for a wide range of speed and turning radius values. To reduce the set of possible solutions, a restricted set of speeds and turning radii may be employed that minimize propulsive power.

This leads to solving the following nonlinear program that solves for v and r while minimizing propulsive power:

$$\min_{\theta, v, r, f_t} \sum_k P_k \tag{32}$$

$$\text{s.t. } c(\theta, v_\theta, r, f_t) = 0, \tag{33}$$

where P is the power for the $k^{th}$ rotor.

To evaluate the power consumed by a vehicle during a turn maneuver, a formulation for the aerodynamic power can be used, given as $$P = f_t V_\perp^\infty + \kappa f_t \left( -\frac{V_\perp^\infty}{2} + \sqrt{\frac{V_\perp^\infty}{4} + \frac{f_t}{2\rho A_{disk}}} \right), \tag{34}$$

where $$V_\perp^\infty$$

is the component of the freestream velocity perpendicular to the actuator disk, $A_{disk}$ is the area of the actuator disk, and κ is a correction factor to deal with unmodeled losses. For this analysis κ=1.2. This formulation assumes that only the free-stream velocity perpendicular to the actuator disks contributes to the generated thrust.

According to some example embodiments, an example method for determining a flight trajectory is provided in the flowchart 900 of FIG. 9. In this regard, according to some example embodiments, the example method may include at 910, receiving image captures, in flight, from a first vision sensor and a second vision sensor of a fixed-wing aerial vehicle, such as UAV 100. The example method may further include determining depth information based on the image captures at 920. At 930, the example method may include determining an initial flight path to a goal point. Additionally, at 940, the example method may include repeatedly updating a flight trajectory, while the aerial vehicle is in flight, based on the initial flight path or a prior flight trajectory, a dynamics model of the aerial vehicle, a nonlinear model predictive control function that operates in association with queries involving the depth information.

According to some example embodiments, another example method for implementing a vertical takeoff (or near vertical takeoff) of a fixed-wing aerial vehicle is provided in the flow chart 1000 of FIG. 10. In this regard, the example method may include controlling a motor to rotate a propeller of the fixed-wing aerial vehicle at a first rotational speed at 1010. At 1020, the example method may include controlling a propeller gimbal, positioned at a nose of the fixed-wing aerial vehicle, to pivot the propeller to a first propeller angle that is greater than fifty-five degrees. Subsequently, the example method may include, at 1030, controlling the motor to rotate the propeller at a second rotational speed that is greater than the first rotational speed. The example method may also include, in response to an angle-of-attack of the aerial vehicle exceeding a threshold angle (e.g., fifty-five degrees between the ground surface and the reference plane), controlling the propeller gimbal to pivot the propeller to reduce the propeller angle to a second propeller angle that is less than the first propeller angle at 1040. Additionally, at 1050, the example method may include, in response to reaching a threshold altitude (e.g., the threshold altitude being greater that a length of the aerial vehicle from a forward end to a rearward end), controlling the propeller gimbal to pivot the propeller to a third propeller angle (e.g., zero degrees) that is less than the second propeller angle for forward flight. According to some example embodiments, a vertical landing of a fixed-wing UAV may be performed by performing the method of FIG. 10 with the operations in reverse order.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An unmanned aerial vehicle (UAV) comprising:
a body having a forward end and a rearward end;
a first fixed wing affixed to the body;
a second fixed wing affixed to the body;
a propeller configured to rotate about a propeller axis;
a motor operably coupled to the propeller and configured to rotate the propeller at a controlled rotational speed to generate thrust;

a propeller gimbal operably coupled to the body at the forward end, the propeller gimbal being configured to pivot the propeller about a gimbal pivot axis to change a propeller angle, the propeller angle being an angle of the propeller axis relative to a reference plane that is perpendicular to a plane that bisects the body between the first fixed wing and the second fixed wing;
a control surface assembly operably coupled to the body; and
a controller configured to control an attitude of flight of the UAV by controlling operation of the motor, the propeller gimbal, and the control surface assembly, wherein
the controller is further configured to control the motor, the propeller gimbal, and the control surface assembly to perform a vertical takeoff by:
controlling the motor to rotate the propeller at a first rotational speed;
controlling the propeller gimbal to pivot the propeller to a first propeller angle that is greater than fifty-five degrees;
controlling the motor to rotate the propeller at a second rotational speed that is greater than the first rotational speed;
in response to an angle-of-attack of the UAV exceeding a threshold angle, controlling the propeller gimbal to pivot the propeller to reduce the propeller angle to a second propeller angle that is less than the first propeller angle; and
in response to reaching a threshold altitude, controlling the propeller gimbal to pivot the propeller to a third propeller angle that is less than the second propeller angle for forward flight.

2. The UAV of claim 1, wherein the controller is further configured to control the propeller gimbal to pivot the propeller between a first position where the propeller axis is parallel to the reference plane and thrust generated by the propeller does not contribute to lift and a second position where the propeller axis is not parallel to the reference plane and thrust generated by the propeller contributes to lift.

3. The UAV of claim 1, wherein the controller is further configured to:
control the control surface assembly to cause the UAV to enter a stall attitude; and
while in the stall attitude, control the propeller gimbal to pivot the propeller into a position where the UAV remains airborne despite maintaining the stall attitude.

4. The UAV of claim 1, wherein the controller is further configured to:
determine an initial flight path to a goal point; and
repeatedly update a flight trajectory, while the UAV is in flight, based on the initial flight path or a prior flight trajectory, a dynamics model of the UAV, and a non-linear model predictive control function.

5. The UAV of claim 4 further comprising a first vision sensor and a second vision sensor coupled to the body, wherein
the controller is further configured to receive image captures from the first vision sensor and the second vision sensor and determine depth information based on the image captures, and
the controller is further configured to repeatedly update the flight trajectory also based on the depth information.

6. The UAV of claim 5, wherein the controller is further configured to control flight of the UAV in accordance with the flight trajectory which includes in-flight feedback-based adjustments to the propeller angle via control of the propeller gimbal for the flight trajectory.

7. The UAV of claim 6, wherein the controller is further configured to control flight of the UAV in accordance with the flight trajectory to perform a turn by:

controlling the control surface assembly to cause the UAV to enter a stall attitude; and while in the stall attitude, control the propeller gimbal to pivot the propeller into a position where the UAV remains airborne despite maintaining the stall attitude; and controlling the control surface assembly to execute the turn while the UAV is in the stall attitude.

8. The UAV of claim 5, wherein the controller is further configured to repeatedly update the flight trajectory also based on a collision constraint indicating a minimum distance to a detected obstacle based on the depth information.

9. The UAV of claim 5, wherein the controller is further configured to repeatedly update the flight trajectory also based on queries against previously stored depth information.

10. The UAV of claim 1, wherein aerial propulsion of the UAV is provided only by the propeller.

11. The UAV of claim 1, wherein the control surface assembly comprises an aileron, an elevator, or a rudder.

12. An aerial vehicle comprising:

a body comprising a first fixed wing and a second fixed wing, the body having a forward end and a rearward end;

a propeller configured to rotate about a propeller axis;

a motor operably coupled to the propeller and configured to rotate the propeller at a controlled rotational speed to generate thrust, wherein the propeller is an only source of thrust for aerial propulsion for the aerial vehicle;

a propeller gimbal operably coupled to the body at the forward end, the propeller gimbal being configured to pivot the propeller about a gimbal pivot axis to change a propeller angle, the propeller angle being an angle of the propeller axis of rotation relative to a wing plane, the wing plane being a plane that extends through the first fixed wing and the second fixed wing;

a control surface assembly coupled to the body; and a controller configured to:

control the control surface assembly, based on a flight trajectory, to cause the aerial vehicle to enter a stall attitude, and while in the stall attitude, to control the propeller gimbal to pivot the propeller into a position where the aerial vehicle remains airborne despite maintaining the stall attitude, wherein the controller is further configured to control the motor, the propeller gimbal, and the control surface assembly to perform a vertical takeoff by:

controlling the motor to rotate the propeller at a first rotational speed;

controlling the propeller gimbal to pivot the propeller to a first propeller angle that is greater than fifty-five degrees;

controlling the motor to rotate the propeller at a second rotational speed that is greater than the first rotational speed;

in response to an angle-of-attack of the aerial vehicle exceeding a threshold angle, controlling the propeller gimbal to pivot the propeller to reduce the propeller angle to a second propeller angle that is less than the first propeller angle; and in response to reaching a threshold altitude, controlling the propeller gimbal to pivot the propeller to a third propeller angle that is less than the second propeller angle for forward flight.

13. The aerial vehicle of claim 12, wherein the controller is further configured to:

determine an initial flight path to a goal point; and repeatedly update the flight trajectory, while the aerial vehicle is in flight, based on the initial flight path or a prior flight trajectory, a dynamics model of the aerial vehicle, and a nonlinear model predictive control function.

14. The aerial vehicle of claim 13, wherein the controller is further configured to control flight of the aerial vehicle in accordance with the flight trajectory which includes in-flight feedback-based adjustments to the propeller angle via control of the propeller gimbal for the flight trajectory.

15. The aerial vehicle of claim 13, wherein the controller is further configured to repeatedly update the flight trajectory also based on queries against previously stored depth information obtained from vision sensors of the aerial vehicle.

\* \* \* \* \*